Dec. 22, 1953 J. H. VOSS 2,663,761

CENTRALIZED CONTROL CIRCUITS FOR FLAT TYPE SWITCHES

Filed March 8, 1950 6 Sheets-Sheet 1

INVENTOR.
JOHN H. VOSS

BY [signature]

ATTORNEY

Dec. 22, 1953 J. H. VOSS 2,663,761

CENTRALIZED CONTROL CIRCUITS FOR FLAT TYPE SWITCHES

Filed March 8, 1950 6 Sheets-Sheet 2

INVENTOR.
JOHN H. VOSS

BY [signature]

ATTORNEY

Dec. 22, 1953 J. H. VOSS 2,663,761

CENTRALIZED CONTROL CIRCUITS FOR FLAT TYPE SWITCHES

Filed March 8, 1950 6 Sheets-Sheet 3

*INVENTOR.*
JOHN H. VOSS

*BY*

ATTORNEY

Dec. 22, 1953 J. H. VOSS 2,663,761

CENTRALIZED CONTROL CIRCUITS FOR FLAT TYPE SWITCHES

Filed March 8, 1950 6 Sheets-Sheet 4

INVENTOR.
JOHN H. VOSS

BY

ATTORNEY

CENTRALIZED CONTROL CIRCUITS FOR FLAT TYPE SWITCHES

Filed March 8, 1950 6 Sheets-Sheet 5

INVENTOR.
JOHN H. VOSS

BY [signature]

ATTORNEY

INVENTOR.
JOHN H. VOSS
BY
ATTORNEY

Patented Dec. 22, 1953 2,663,761

UNITED STATES PATENT OFFICE 2,663,761

CENTRALIZED CONTROL CIRCUITS FOR FLAT TYPE SWITCHES

John H. Voss, Rochester, N. Y., assignor to Automatic Electric Laboratories, Inc., Chicago, Ill., a corporation of Delaware Application March 8, 1950, Serial No. 148,284

22 Claims. (Cl. 179—18)

This invention relates in general to automatic telephone exchange systems, but is more particularly concerned with the centralized control system for a train of flat type switches.

An object of this invention is to provide a common control unit which controls the operation of the associated flat type selector and connector switches, and whereby relays at the selector and connector switches are completely eliminated.

A feature of the present invention is that considerable economic advantage is had by controlling selectors and connectors from a single relay unit.

Figures 1, 9:
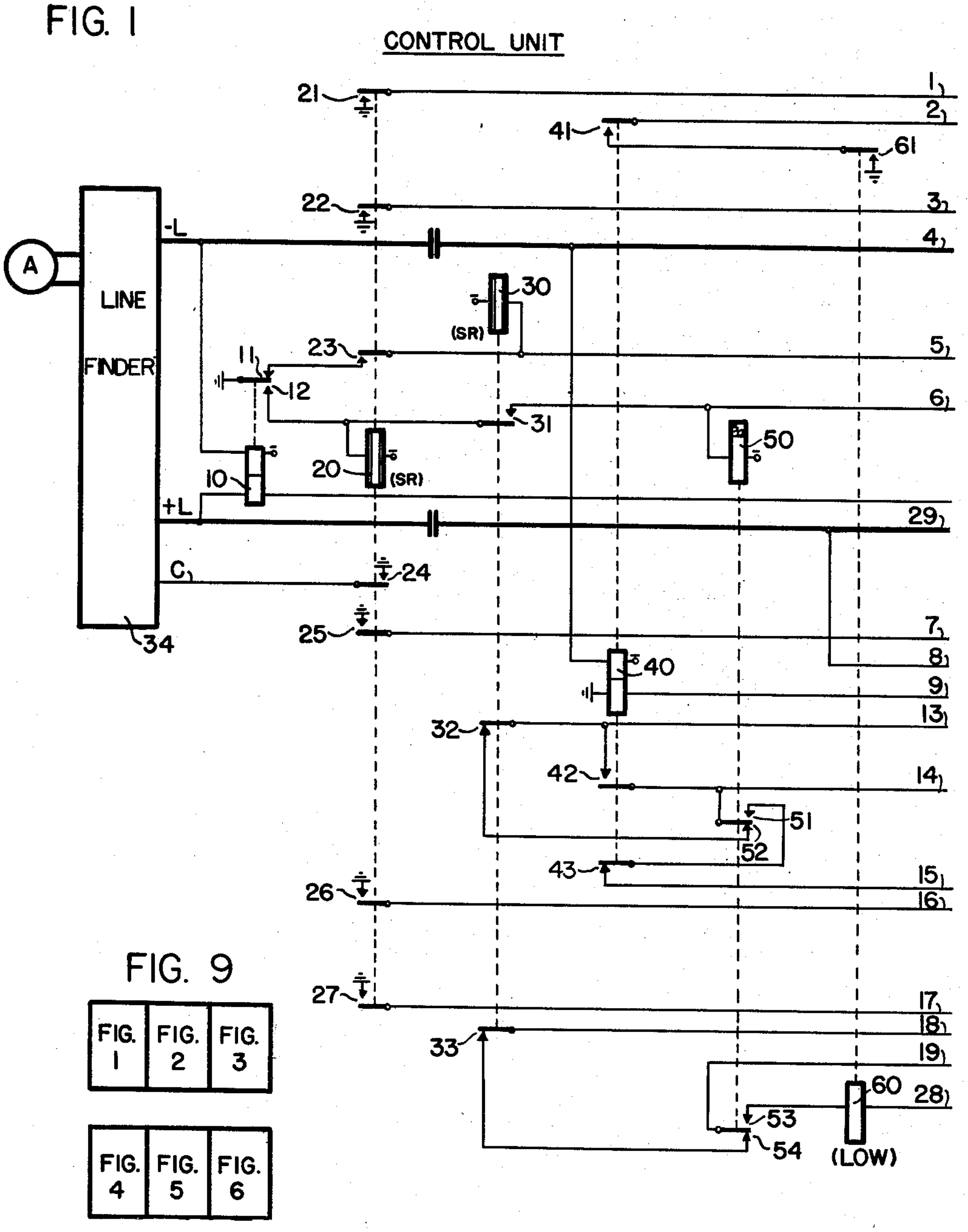
Figure 2:
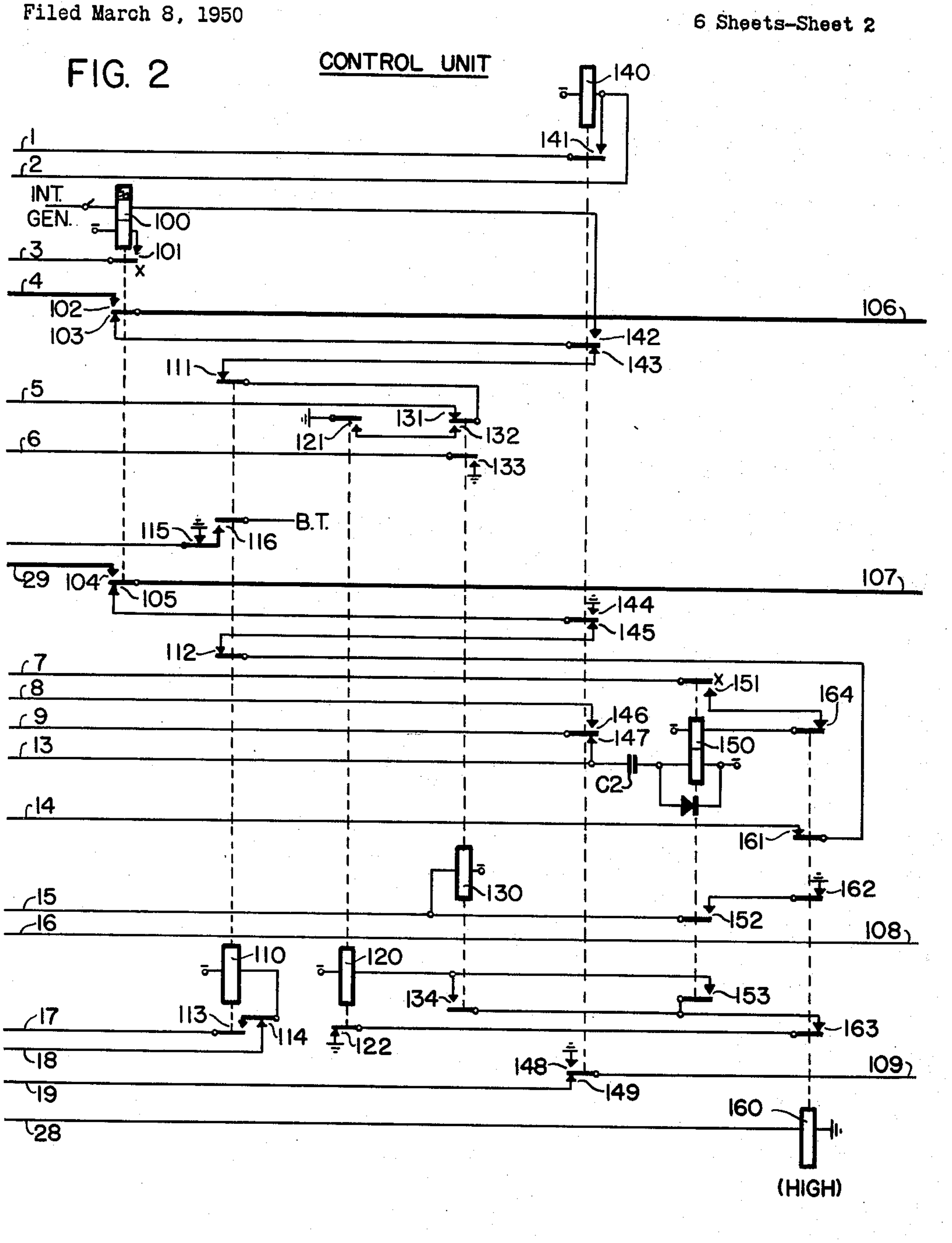
Figures 3, 7:
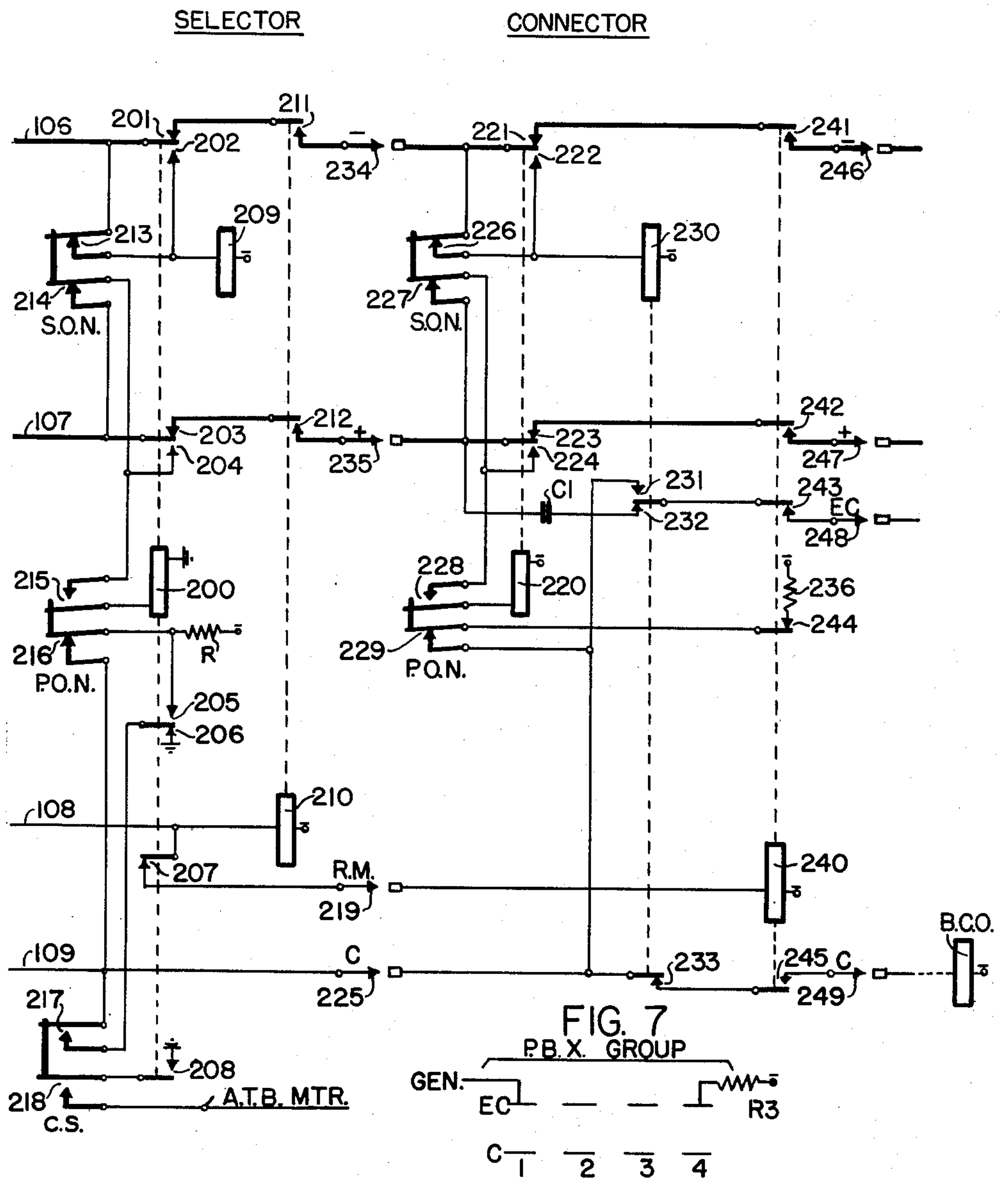

Figures 1, 2 and 3 show a diagrammatic representation of one system utilizing the present invention and illustrating an arrangement whereby each selector and connector switch uses a four conductor bank. Figures 1 and 2 illustrate diagrammatically the centralized control unit; Figure 3 illustrates diagrammatically the selector and connector switches.

Figure 4:
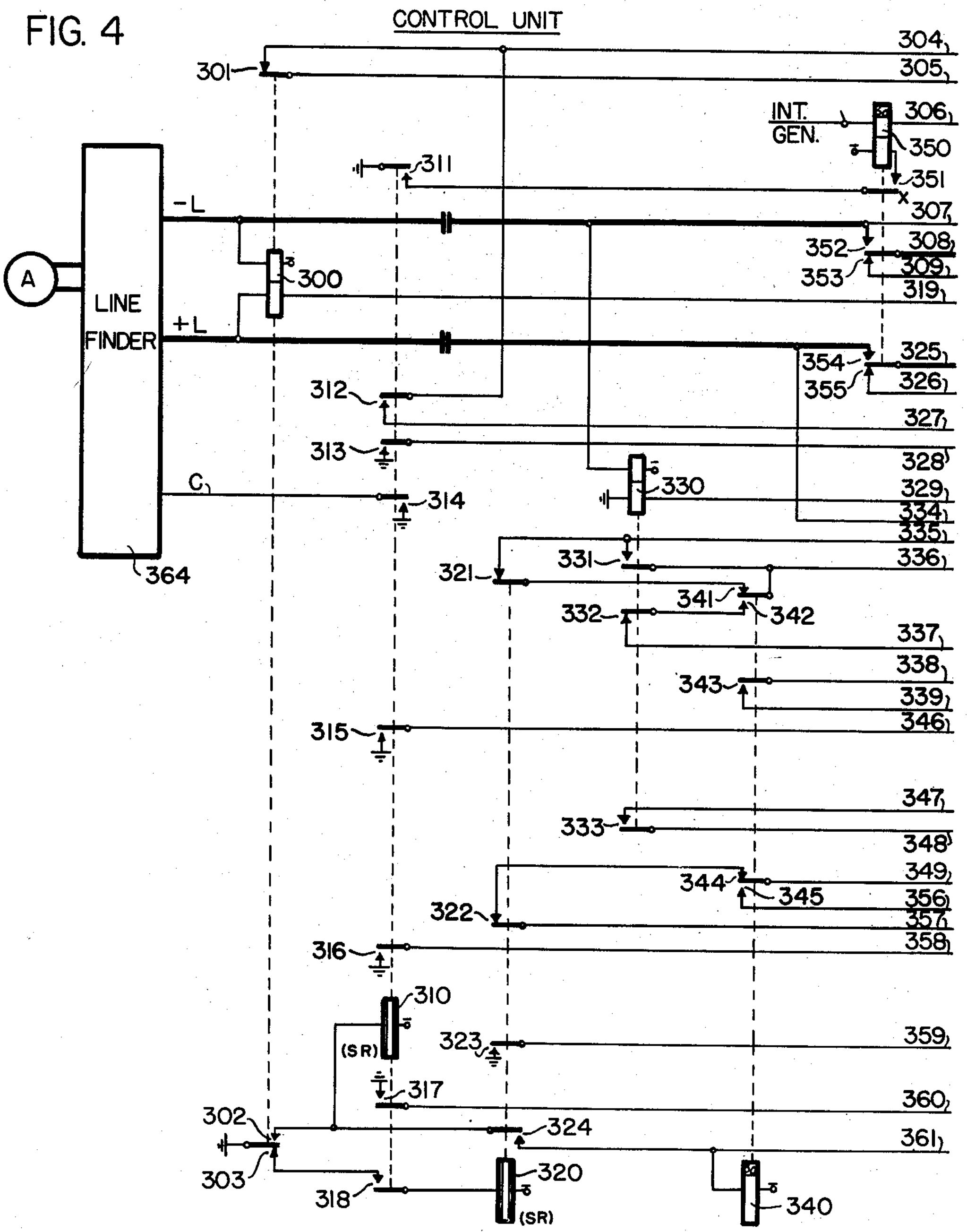
Figure 5:
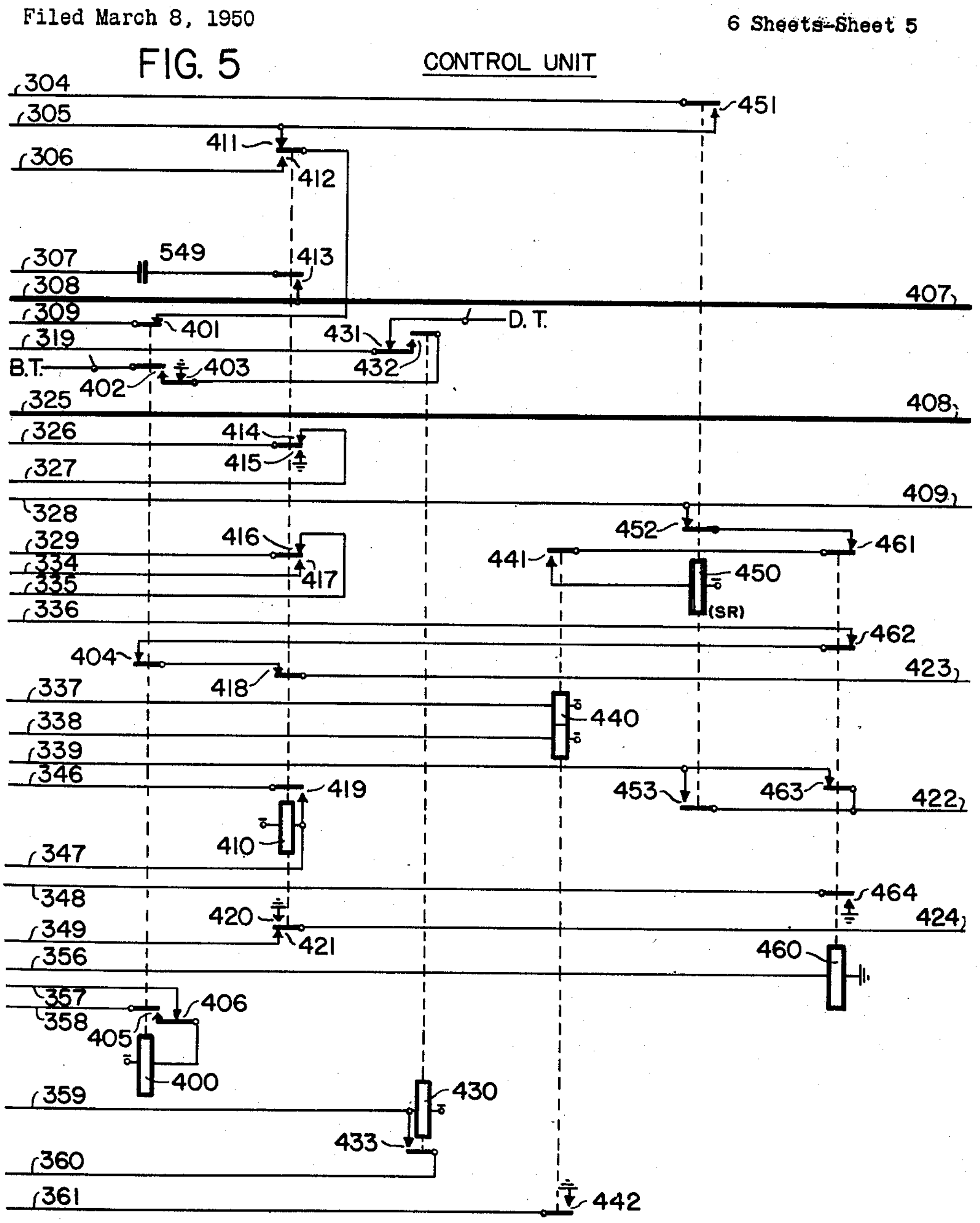
Figures 6, 8:
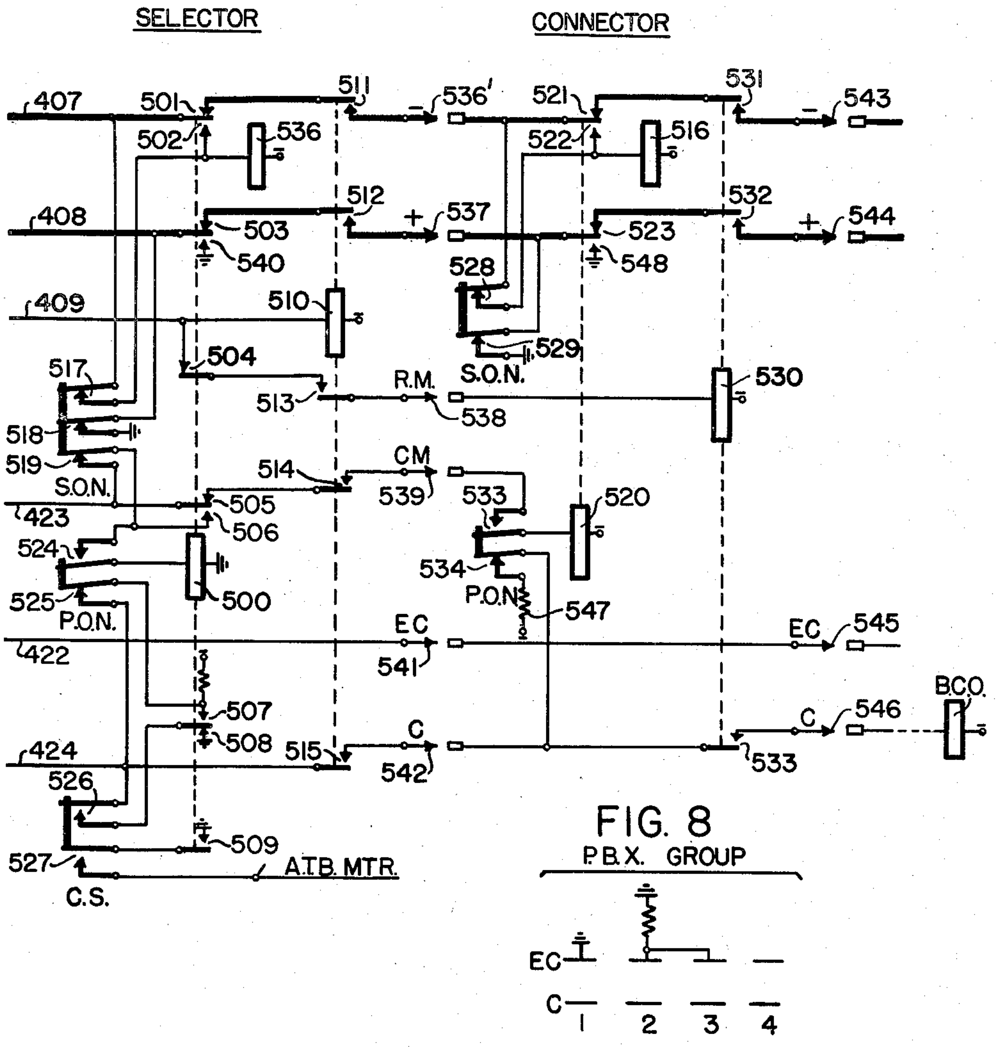

Figures 4, 5 and 6 show a diagrammatic representation of another system utilizing the present invention, and illustrating an arrangement whereby the selector uses a six conductor bank and the connector uses a four conductor bank. Figures 4 and 5 illustrate diagrammatically the centralized control unit; whereas Figure 6 illustrates diagrammatically the connector and selector switches.

Figure 7 is a P. B. X bank contact grouping arrangement for the "EC" and "C" conductors of a group of private branch exchange lines in the system shown in Figures 1, 2 and 3.

Figure 8 is a P. B. X bank grouping arrangement for the "EC" and "C" conductors of a group of private branch exchange lines in the system shown in Figures 4, 5 and 6.

Figure 9 illustrates the grouping arrangement for the respective figures illustrating the several systems.

Referring now to Figures 1, 2 and 3, line finder 34 is of the type well-known in the art. Substation A includes a dialing mechanism and is also well-known in the art. Substation A is a substation of the calling party. The circuit herein disclosed may be used with the flat type switches which are well known in the art, but are preferably used with the flat type switches described in a pending application, Serial No. 792,510 filed on December 18, 1947, by Hans Sengebusch, now Patent 2,578,095, issued December 11, 1951, in which the operation of the release magnet permits the switch to remain off-normal and whereby the switch releases when the release magnet is deenergized. The selector switch has a common drive magnet 209, which steps the wipers of the flat type switch in both the primary and secondary movements. The shift magnet 200 operates to shift the operation of the switch from the primary to the secondary movement. Release magnet 210 operates when the relay 20 operates on seizure, and remains operated until the switch is to be released. The selector switch releases in response to deenergization of the release magnet 210. The connector switch also has a common drive magnet 230, which steps the flat type switch wipers in both the primary and secondary movements. The shift magnet 220 of the connector operates to shift the operation of the switch from the primary to the secondary movement. Release magnet 240 of the connector switch operates the moment the connector is seized by the selector switch, and remains operated until the switch is to be released. The connector switch is released in response to the deenergization of the release magnet 240. The centralized control relay unit in Figs. 1 and 2 controls the operation of both the associated selector and connector switches.

In this specification the expression control relay unit means a group of relays which precede a train of switches and exerts control over a plurality of contacts to bring about successive operations in the switches taken into use whereby the number of control relays individual to the switches may be reduced.

Relays 60 and 160 are the testing relays for both the selector and connector switches and the switches are of the battery searching type which must find negative battery potential in order to switch through. The first series of dial pulses operates the selector switch in its primary movement and the selector hunts automatically in its secondary movement. The second series of dial pulses step the seized connector switch in the primary movement. The third series of pulses steps the connector switch to either a subscriber's line or the first line in a P. B. X group. If a first line in a P. B. X group is connected with the connector and such line is busy, an automatic stepping circuit is completed to cause the connector to hunt for an idle line of the P. B. X group. Relay 120, included in a self-interrupting circuit, controls a stepping circuit to cause the selector to operate in its secondary movement to hunt for an idle trunk and also cause the connector to operate in its secondary movement to hunt for an idle trunk line in the P. B. X group.

In Fig. 7 the "EC" bank contact of the first line in the P. B. X group is shown connected to generator GEN. to provide alternating current. The intermediate "EC" bank contacts of the intermediate lines are left blank while the "EC" bank contact of the last line in the P. B. X group is connected to battery through a resistance.

In Fig. 8 the "EC" bank contact of the first line in this P. B. X group is shown connected to direct ground. The intermediate "EC" bank contacts of the intermediate P. B. X lines are connected to ground through a resistance while the last "EC" bank contact of the last line in the P. B. X group is left blank.

In more detail, when the calling subscriber at substation A raises his handset, not shown, from the cradle, line relay 10 is seized through the associated line finder 34 in the well-known manner. Relay 10 operates over the subscriber's loop. Contacts 12 make to operate slow-to-release relay 20. Relay 20 operates and contacts 24 make to ground the "C" lead to hold the line finder and the line equipment. Contacts 26 make to put ground on conductor 16 to operate the release magnet 210 of the selector switch to permit the selector switch to step under the control of the drive magnet 209 of the selector switch. Contacts 23 close to prepare the pulsing circuit to permit the selector switch to step under the control of the drive magnet 209 in response to the dialing pulses from substation A and also to prepare a circuit to operate relay 30. Contacts 21 close to prepare the locking circuit for relay 140 of the control unit; contacts 22 close to prepare the locking circuit for ring-cut-off relay 100; contacts 25 put ground on conductor 7 to prepare the locking circuit for relay 150.

The calling party at substation A dials a series of digital impulses corresponding to the number of the called party to interrupt the circuit to relay 10 for repeating impulses over the following path: ground, contacts 11, contacts 23, conductor 5, contacts 131, contacts 111, contacts 143, contacts 103, conductor 106, S. O. N. contacts 213 and drive magnet 209 to battery. Slow-to-release relay 30 operates during each series of impulses over the following path: ground, contacts 11, contacts 23, relay 30 and battery.

Relay 30 operates and contacts 31 make to connect relay 50 in multiple with relay 20; contacts 33 break to disconnect relay 110 from the "C" wiper 225 and contacts 32 break to open a circuit to disconnect relay 150 from the positive talking conductor. Relay 50 being a slow-to-operate relay does not operate during the receiving of impulses repeated by relay 10, but does operate at the completion of each series of pulses before slow-to-release relay 30 releases.

The first series of impulses are transmitted to the drive magnet 209 of the selector by grounding the back contacts of relay 10 over the previously described path. The drive magnet 209 steps the selector wipers 234, 235, 219 and 225 to the bank level selected in accordance to the number of digital impulses in the first digit. When the selector wipers take the first step, P. O. N. contacts 215 prepare a circuit to the shift magnet 200 of the selector switch and contacts 216 open a circuit to the cam switch as well as disconnecting negative battery potential through resistance R from from conductor 109 to prevent the operation of test relays 60 and 160 when relay 50 operates. After the first series of impulses are repeated and before relay 30 releases, relay 50 operates over the following path: battery, relay 50, contacts 31, contacts 12 and ground. Contacts 51 make to operate relay 130 in series with the shift magnet 200 over the following path: battery, relay 130, conductor 15, contacts 43, contacts 51, conductor 14, contacts 161, contacts 112, contacts 145, contacts 105, conductor 107, S. O. N. contacts 214, P. O. N. contacts 215, shift magnet 200 and ground. It is to be noted that shift magnet 200 is operated in series with relay 130 after receipt of the first series of impulses. Contacts 53 close to place testing relay 60 and testing relay 160 in series with the "C" wiper 225 for testing idle or busy connectors.

Shift magnet 200 operates after primary movement and prepares the selector through a mechanical operation for subsequently operating the wipers across a selected bank level to hunt for an idle connector in the manner set forth in the cited Sengebusch application. Contacts 201 and 203 break to open the circuits to the wipers to prevent interference during rotation thereof. Contacts 207 open the circuit to wiper 219 of the selector and contacts 208 prepare a ground connection to the all trunk busy meter. Relay 130 operated in series with shift magnet 200 and contacts 133 completes a holding circuit to relay 50 to maintain relay 50 operated. Contacts 134 make to operate pulsing relay 120 for the stepping of the drive magnet 209 in the secondary direction. Contacts 132 make to prepare the pulsing circuit for the drive magnet 209 to step the selector switch in the secondary direction. Contacts 131 break to open the primary pulsing circuit to the drive magnet 209. Relay 30 releases shortly after the first digit.

Relay 120 operates over the following path: battery, relay 120, contacts 134, contacts 163, contacts 122 and ground. The selector is of the battery searching type and when an idle switch is found a high resistance battery is found on the "C" wiper 225 to operate high resistance relay 160. When pulsing relay 120 operates, contacts 121 make to operate the drive magnet 209 to step the selector switch wipers to the first bank contact in the secondary movement over the following path: ground, contacts 121, contacts 132, contacts 111, contacts 143, contacts 103, conductor 106, S. O. N. contacts 213 or 202, magnet 209 and battery. The switch steps in the secondary movement and S. O. N. contacts 213 and 214 break on the first step. If the connector is busy the bank contact engaged by wiper 225 will have a ground potential thereon or if the wiper 225 fails to find negative battery potential, the test relays 60 and 160 fail to operate. In either case relay 120 interrupts its own circuit at contacts 122 and in case test relay 160 has not operated relay 120 is reoperated on closure of contacts 122 to repeat the above-described operation for operating the drive magnet 209, this time over contacts 202 since S. O. N. contacts 213 are now open. This operation is repeated until an idle connector having battery potential connected to its associated bank contact is found or until the 11th bank contact is reached.

In case the test wiper 225 fails to find an idle connector switch, the wipers of the selector step off the last bank contact of the selected group to their 11th position and the cam springs CS are operated. Cam springs 218 close a circuit for operating the all trunk busy meter ATB–MTR from ground at contacts 208, cam springs 218 and the common all trunk busy meter conductor. Cam springs 217 close a circuit for operating the high resistance test relay 160 as follows: ground thru the winding of relay 160, winding of the low resistance test relay 60, contacts 53 and 149, conductor 109, cam springs 217, contacts 205 and thru the high resistance R to battery. Due to the high resistance R relay 60 does not operate but relay 160 operates and at contacts 161 opens the circuit to relay 130 and shift magnet 200 to cause their release. At contacts 163, relay 160 opens the circuit to pulsing relay 120 to prevent its reoperation.

The release of shift magnet 200 in the selector switch opens the circuit to stepping magnet 209 at contacts 202 to prevent reoperation of magnet 209. At contacts 204 magnet 200 opens a further point in its own circuit and at 208 opens the circuit to the all-trunk busy meter ATB–MTR. At contacts 205, magnet 200 opens the circuit to test relay 160 and substitutes ground at contacts 206 to close a shunt circuit around test relay 160 thereby rendering the test relay somewhat slow to release.

Relay 130, upon releasing, at contacts 132 opens a further point in the pulsing circuit, at contacts 134 opens a further point in the circuit to pulsing relay 120, and at contacts 133 opens the circuit to relay 50 which releases. Relay 50 at contacts 53 opens the circuit to test relay 160 and at contacts 54 completes a circuit for operating busy relay 110 as follows: ground, contacts 206, 217, conductor 109, contacts 149, 54, 33 and 114, and thru the winding of busy relay 110 to battery.

Busy relay 110, upon operating, at contacts 111 opens a further point in the stepping circuit, at contacts 112 opens a further point in the circuit to shift magnet 200, and at contacts 113 completes a locking circuit for itself from grounded contacts 27 after which contacts 114 opens its original energizing circuit. At contacts 116 busy relay 110 substitutes grounded busy tone source for the disconnected ground at contacts 115. Busy tone is now transmitted to the calling party through the lower winding of line relay 10 and over the calling loop in the well-known manner. In response to receipt of busy tone the calling party replaces his receiver to release the switch train in a manner to be described later.

Let us assume that the connector connected to wipers 234, 235, 219 and 225 is the first idle connector engaged by said wipers during its searching operation. "C" wiper 225 is connected to battery through high resistance 236, contacts 244 and P. O. N. contacts 229 of the connector. High resistance relay 160 operates over the following path: ground, high resistance relay 160, low resistance relay 60, contacts 53, conductor 19, contacts 149, conductor 109, wiper 225, P. O. N. contacts 229, contacts 244, resistance 236 and battery. Relay 160 alone operates due to high resistance 236 and contacts 163 open the operating circuit of pulsing relay 120. Contacts 161 open the circuit to release shift magnet 200 and relay 130. Contacts 163 open the operating circuit to relay 120. Relay 130 releases and contacts 131 make to prepare the pulsing circuit for the primary movement for the connector switch. Contacts 132 break to open the pulsing circuit for the secondary movement; contacts 134 break to further open the circuit to the pulsing relay 120; contacts 133 break to release relay 50. Relay 50 releases and contacts 51 break to further open the operating circuit for relay 130; contacts 53 break to open the testing circuit to relays 60 and 160, and contacts 52 close to prepare an operating circuit for shift magnet 220 of the connector. Relay 160 releases and contacts 161 prepare the operating circuit to the shift magnet 220 of the connector; and contacts 163 prepare the operating circuit for relay 120.

Shift magnet 200 released in a manner previously described and contacts 201 and 203 prepare the circuit for controlling the connector switch. Contacts 207 make to operate release magnet 240 of the connector switch over the following path: battery, release magnet 240, wiper 219, contacts 207, conductor 108, contacts 26 and ground.

The system is now prepared for dialling the second digit to step the connector in the primary movement. The second series of pulses from the substation A operates line relay 10 to repeat these pulses to the drive magnet 230 of the connector switch over the following path: ground, contacts 11, contacts 23, conductor 5, contacts 131, contacts 111, contacts 143, contacts 163, conductor 106, contacts 201, contacts 211, wiper 234, S. O. N. contacts 226, drive magnet 230 and battery. Relay 30 again operates over a path previously described and at contacts 32 opens the operating circuits to relays 40 and 130. Drive magnet 230 steps the connector switch wipers in response to the repeated impulses to the selected bank level.

When the connector switch stepped on the first pulse of the primary movement, P. O. N. contacts 228 make and P. O. N. contacts 229 break. P. O. N. contacts 228 prepare the circuit to operate the shift magnet 220 of the connector switch. Slow-to-operate relay 50 operated again at the completion of the second series of digital impulses before relay 30 restores and at contacts 52 opens the operating circuit for relay 40. Relay 130 does not operate this time, since shift magnet 220 of the connector is battery connected.

Relay 30 releases, contacts 31 open the operating circuit of relay 50, and contacts 32 prepare the operating circuit for relay 40. Relay 50 releases and contacts 52 make to place the lower winding of relay 40 in series with the shift magnet 220 of the connector over the following path: battery, shift magnet 220, P. O. N. contacts 228, S. O. N. contacts 227, wiper 235, contacts 212, contacts 203, conductor 107, contacts 105, contacts 145, contacts 112, contacts 161, conductor 14, contacts 52, contacts 32, conductor 13, contacts 147, conductor 9, relay 40 and ground.

Shift magnet 220 operates over the above-traced circuit and prepares the connector mechanically, as described in the cited application, for stepping the wipers 246, 247, 248 and 249 across the bank contacts of the dialled level in response to the third series of digital impulses. Magnet 220, at contacts 221 and 223, opens the circuit to wipers 246 and 247 to prevent disturbances as such wipers are passing over the bank contacts of busy called lines, at contacts 222 maintains the pulsing circuit to magnet 230 independent of the subsequent operation of the secondary off-normal contacts S. O. N., and at contacts 224 maintains the circuit to shift magnet 220 when S. O. N. contacts 227 open. Relay 40 operates over the above-traced circuit and contacts 41 prepare an operating circuit to relay 140. Contacts 42 complete an alternative circuit between relay 40 and shift magnet 220 independent of contacts 32 which are opened when relay 30 operates during the third series of digital impulses. Contact 43 opens the circuit to relay 130.

The system is now prepared for the third series of digital impulses. To step the wiper of the connector in its secondary movement to the selected bank contacts, drive magnet 230 is stepped in response to the third series of dialing impulses by interrupting relay 10. The circuit for operating drive magnet 230 may be traced over the following path: ground, contacts 11, contacts 23, conductor 5, contacts 131, contacts 111, contacts 143, contacts 103, conductor 106, contacts 201, contacts 211, wiper 234, contacts 226, drive magnet 230 and battery.

The connector switch takes the first secondary step and the S. O. N. contacts 226 and 227 break. The shift magnet 220 maintains a circuit to the drive magnet 230 at contacts 222 when S. O. N. contacts 226 open on the first step in the secondary movement and at contacts 221 and 223 prevents interference with the lines over which the wipers pass.

At the end of the third series of digital impulses slow-to-operate relay 50 again operates before relay 30 releases and contacts 53 make to connect the testing relays 60 and 160 to the "C" wiper 245 of the connector to test for an idle line.

If the called line is idle, battery on "C" wiper 249 will operate relay 60 in series with relay 160 over the following path: ground, relay 160, relay 60, contacts 53, contacts 149, conductor 109, wiper 225, contacts 233, contacts 245, wiper 249, and through the winding of the called line cut-off relay to battery. Relays 160 and 60 operate and relay 60 at contacts 61 closes a circuit to operate relay 140 over the following path: battery, relay 140, conductor 2, contacts 41, contacts 61 and ground.

If the called line is busy wiper 249 encounters a grounded bank contact with the result that test relays 60 and 160 do not operate. Now when relays 30 and 50 restore, as previously described, busy relay 110 operates over the following path: battery, relay 110, contacts 114, conductor 18, contacts 33, contacts 54, conductor 19, contacts 149, conductor 109, wiper 225, contacts 233, contacts 245, "C" wiper 249, and the busy ground found on the "C" lead of the called line.

Relay 110 operates and contacts 113 lock relay 110 through ground on contacts 27. Contacts 111 open the pulsing circuit to drive magnet 230. Contacts 112 break to release the shift magnet 220 and relay 40. Shift magnet 220 releases when its circuit is opened at contacts 112 to open further points in the circuits for magnets 230 and 220 at contacts 222 and 224, respectively. At contacts 221 and 223, magnet 220 closes the talking circuit connection with the called line to the control unit which circuit, however, is open at contacts 111 and 112 to prevent interference. It will be noted at this time that if the armature springs of contacts 111 and 112 were provided with make contacts an arrangement could easily be added to provide a means for monitoring the busy connection if desired. The release of relay 40 at this time is without function. At contacts 116 busy relay substitutes the busy tone source for ground thereby transmitting busy tone to the calling party. The release of the switch train is accomplished by the calling party replacing his receiver in a manner to be described hereinafter.

Assuming that the called line is idle, relays 60 and 160 operate in a manner previously described and relay 60 thereby operates relay 140 by grounding contacts 61 in a manner previously described. Relay 160, upon operating, at contacts 161 opens the energizing circuit of relay 40 and shift magnet 220 which release. Relay 140 operates and locks itself over the following path: battery, relay 140, contacts 141, conductor 1, contacts 21 and ground. Contacts 147 and contacts 145 open to open further points in the circuit of relay 40 and the shift magnet 220. Contacts 144 prepares a point for the ground return ringing circuit and contact 146 prepares a new circuit for reoperating the back bridge relay 40. Contacts 149 opens the circuit to test relays 60 and 160 which release and contacts 148 put ground on the "C" wiper 249 to busy the called line. Contacts 143 break to open the pulsing circuit and contacts 142 make to connect the interrupter generator through the winding of relay 100. Ring back tone may be sent to the calling party in any known manner. Magnet 220 released in a manner previously described to complete ringing the called party. The ringing circuit may be traced as follows: Interrupted generator, upper winding of ring-cut-off relay 100, contacts 142, 103, 201, 211, wiper 234, contacts 221 and 241, wiper 248, over the called subscriber loop, back to wiper 247, contacts 242 and 223, wiper 235, contacts 212, 203, 105 and 144 to ground.

When the called party answers slow-to-operate ring-cut-off relay 100 operates over the following path: ground, contacts 144, 105, 203, 212, 223, 242, wiper 247, the called line loop, wiper 248, contacts 241, contacts 221, wiper 234, contacts 211, contacts 201, conductor 106, contacts 103, contacts 142, relay 100 and the interrupter generator conductor to battery. Relay 100 locks at contacts 101 over the following path: battery, lower winding of ring cut-off relay 100, contacts 101, conductor 3, contacts 22 and ground. Contacts 103 and 105 open the above-traced ringing circuit and contacts 102 and 104 complete the talking circuit between the calling and called party. Talking battery is furnished to the called line through the windings of back bridge relay 40 which energizes over the called subscriber's loop and performs no further function at this time. When the calling party replaces his handset relay 10 releases. Contacts 12 break to release relay 20. Relay 20 removes ground from the "C" lead through contacts 24 thereby permitting the line finder and line equipment to release. Contacts 26 break to remove ground from the release magnet 210 to release the selector switch and also to remove ground from the release magnet 240 to release the connector switch. Contacts 21 remove ground from the locking circuit of relay 140 to release relay 140. Contacts 22 remove ground from the locking circuit to release relay 100. Contacts 27 removes ground from the locking circuit to release busy relay 110 in case the calling party encounters a busy condition. All relays are now released and the system prepared for further operation.

Referring now to Figure 7, the foregoing disclosure has assumed that an individual line has been called. If a P. A. X group of subscriber lines having a single call number had been called "EC" wiper 248 and "C" wiper 249 of the connector would have encountered conditions as shown in Figure 7 for the P. B. X group. Let us assume at this point that the connector has been directively stepped in the secondary movement as was previously described to the first line in a P. B. X group. It is to be noted that the connector is a battery searching connector. If the first line in the P. B. X group is idle, relays 60 and 160 will operate in series with the B. C. O. relay of the called line, over the following path: battery, B. C. O. relay of the called line, the called line bank contact, wiper 249, contacts 245, contacts 233, wiper 225, conductor 109, contacts 149, conductor 19, contacts 53, relay 60, relay 160, and ground.

Relay 160 operates and contacts 161 open the circuit to relay 40 and shift magnet 220. Relay 60 operates and contacts 61 close to operate relay 140 before relay 40 releases over the following path: ground, contacts 61, contacts 41, conductor 2, relay 140, and battery.

Relay 140 operated and locked itself by closing contacts 141 over the following path: battery, relay 140, contacts 141, conductor 1, contacts 21 and ground. Contacts 147 and 145 open further points in the circuit of relay 40 and the shift magnet 220 in a manner previously described. Contacts 149 open the circuit to relays 60 and 160 and contacts 148 put ground on the "C" wiper 249 to busy the same over an obvious circuit. Contacts 142 make to connect the interrupter generator to the called line through the upper winding of relay 100. Magnet 220 released in a manner previously described to permit ringing the called party when contacts 221 and 223 make.

When the called party answers, slow-to-operate ring cut-off relay 100 is operated as previously described. Relay 100 locks at contacts 101 and at contacts 102 and 104 completes the talking circuit between the calling and called party.

If, however, the first line in the group is busy relays 60 and 160 will not operate. The "EC" wiper 248 will encounter a grounded generator voltage on the first trunk line, as shown in Figure 7. The generator voltage operates alternating current relay 150 over the following path: grounded generator on the "EC" bank contact, wiper 248, contacts 243, contacts 232, condenser C1, wiper 235, contacts 212, contacts 203, conductor 107, contacts 105, contacts 145, contacts 112, contacts 161, conductor 14, contacts 42, conductor 13, conductor C2, relay 150, and battery. Relay 150 operates and locks over the following path: battery, relay 150, contacts 164, contacts 151, conductor 7, contacts 25 and ground. Contacts 152 make to operate relay 130 over the following path: ground, contacts 162, contacts 152, relay 130 and battery. Contacts 153 make to operate relay 120 over the following path: battery, relay 120, contacts 153, contacts 163, contacts 122 and ground.

Relay 130 operates and contacts 133 close to maintain relay 50 operated. Contacts 132 close to prepare a pulsing circuit to drive magnet 230 to step the connector in a further secondary movement. Contacts 134 make to add another operating circuit to relay 120.

Relay 120 operates and contacts 121 close to step the connector switch in a secondary movement over the following path: ground, contacts 121, contacts 132, contacts 111, contacts 143, contacts 163, conductor 106, contacts 201, contacts 211, wiper 234, contacts 222, magnet 230 and battery. Drive magnet 230 steps the connector wiper to the next trunk line of the P. B. X group. Relay 120 self-interrupts its operating circuit through contacts 122. The shift magnet 220 of the connector remains operated in series with relay 40. As heretofore explained, the connector is now automatically stepping across the trunks of the P. B. X group in search of battery to stop its rotation. If an intermediate trunk line is idle, relays 60 and 160 will operate as heretofore explained to stop the rotation of the connector wipers by opening the operating circuit to relay 120 at contacts 163, and to cause a switch through to the called line as heretofore explained.

If an intermeditae line is not idle the connector wiper 248 upon reaching the last trunk line in the P. B. X group encounters battery through a high resistance, such as R3 shown in Figure 7 before the stepping magnet releases. Relay 160 alone operates due to the high resistance R3 over the following path: battery, high resistance R3, last "EC" bank contacts of the P. B. X group, wiper 248, contacts 243, contacts 231, wiper 225, conductor 109, contacts 149, contacts 53, relay 60, conductor 28, relay 160 and ground. Relay 160 operates to prevent further pulsing by opening the locking circuit of relay 150 at contacts 164 and the operating circuit of relay 120 at contacts 163. Contacts 162 breaks to de-energize relay 130 and contacts 161 opens the operating circuit of relay 40 and shift magnet 220 which release. Relay 150 releases to open a further point in the circuit of relay 130 at contacts 152 to prevent reoperation of relay 130 after the subsequent release of relay 160 and at contacts 153 opens a further point in the circuit of relay 120. Relay 130 releases and contacts 133 break to release relay 50 over a path previously described for maintaining the same operated. Contacts 132 opens the operating circuit to stepping magnet 230. Contacts 134 break to open another point in the operating circuit to relay 120. Magnet 230 releases and opens contacts 231 to open the circuit of relay 160 which releases. The release of relay 160 is without effect at this time because the circuits to relays 120 and 130 are opened at contacts 153 and 152 by the release of relay 150.

If the last trunk line of the P. B. X group is idle, relays 60 and 160 will also operate as before from battery through the B. C. O. relay of the last line in the P. B. X group and through the "C" connector wiper before relay 50 restores, thereby causing a connection to be made to the last P. B. X line in the P. B. X group in a manner previously described. The circuit to operate relays 60 and 160 is as follows: battery through the B. C. O. relay of the last line in the P. B. X group, wiper 249, contacts 245, contacts 233, wiper 225, conductor 109, contacts 149, contacts 53, relay 60, conductor 28, relay 160 and ground.

If the last trunk line in a P. B. X group is busy relay 110 operates after relay 50 restores. "C" connector wiper 249 encounters a ground connection on the "C" bank contact of the last line in the P. B. X group to operate relay 110 over the following path: ground on "C" wiper 249, contacts 245, contacts 233, wiper 225, conductor 109, contacts 149, conductor 19, contacts 54, contacts 33, conductor 18, contacts 114, relay 110 and battery. Relay 110 operates to return busy tone to the calling party as previously described. The system releases in a manner heretofore explained in the operation of a call to a direct line.

Referring now to Figures 4, 5, 6 and 8, line finder 364 is of the type well known in the art. Substation A includes a dialing mechanism and is also well known in the art. Substation A is the substation of the calling party. The circuits herein disclosed may be used with the flat type switches which are well known in the art, but are preferably used with the flat type switches disclosed in the pending application, Serial No. 792,510, filed on December 18, 1947, by Hans Sengebusch, now Patent 2,578,095, issued December 11, 1951, in which the operation of the release magnet permits the switch to remain off-normal and whereby the switch releases which the release magnet is deenergized. The selector switch has a common drive magnet 536 which steps the flat type switch in both the primary and secondary movements. The shift magnet 500 operates to condition the switch for stepping the switch in the secondary movement. Release magnet 510 operates upon seizure of the switch, when relay 310 operates, and remains operated until the switch is to be released. The selector, therefore, releases in response to the de-energization of the release magnet 510. The connector switch also has a common drive magnet 516 which steps the flat type switch in both the primary and secondary movements. The shift magnet 520 of the connector operates to condition the switch for stepping in the secondary movement. Release magnet 530 of the connector switch operates the moment the connector is seized by the selector switch and remains operated until the switch is to be released. The connector switch is released in response to the deenergization of the release magnet 530. A centralized control relay unit controls the operation of both the associated selector and connector switches. The centralized control unit is separately located from the aforementioned switches.

Relay 400 is a testing relay for both the selector and connector switches, and the switches are of the battery hunting type. The first series of dialing pulses operates the selector switch for the primary movement after which the selector hunts automatically in its secondary movement to seize an idle connector switch. The second series of dial pulses steps the connector switch in its primary movement. The third series of pulses steps the connector switch in its secondary movement to an individual called line or to the first line in a P. B. X group. If a P. B. X group is called, an automatic stepping circuit causes the connector switch to hunt for an idle line of the P. B. X group. Relay 450 includes a self-interrupting circuit which provides the hunting operation for the secondary movement of the selector switch and the hunting operation for the idle line of the P. B. X group.

In more detail, when the control relay unit is seized through the associated line finder 364, line relay 300 operates over the subscriber's loop. Dial tone is immediately sent back to the substation A over the following path: D. T. terminal, contacts 431, conductor 319, relay 300, conductor +L, line finder 364, and substation A. Relay 300 operates and contacts 302 make to operate relay 310.

Relay 310 operates and contacts 311 prepare a locking circuit for relay 350. Contacts 312 prepare the pulsing circuit to drive magnet 536. Contacts 313 make to operate release magnet 510 of the selector over the following path: ground, contacts 313, conductor 326, conductor 409, release magnet 510 and battery. Contacts 314 make to ground the "C" lead to hold the line finder 364 and line equipment operated. Contacts 315 make to prepare a locking circuit for relay 410. Contacts 316 close to prepare a locking circuit for busy relay 400. Contacts 317 prepare a locking circuit for relay 430. Contacts 318 prepare a circuit for slow-to-release relay 320.

The drive magnet 536 of the selector steps the switch in the primary movement and is pulsed over the following circuit: battery, drive magnet 536, S. O. N. contacts 517, conductor 407, conductor 308, contacts 353, conductor 309, contacts 401, contacts 411, conductor 305, contacts 301, contacts 312, conductor 327, contacts 414, conductor 326, contacts 355, conductor 325, conductor 408, S. O. N. contacts 518 and ground. The drive magnet 536 is pulsed in response to contacts 301 operating as relay 300 repeats the incoming dial impulses.

The first series of dialled impulses is transmitted by substation A which interrupts the operating circuit of relay 300 and thereby steps the drive magnet 536 through the above-described circuit. After the first step primary off-normal P. O. N. contacts 524 make to prepare a circuit for operating the shift magnet 500 and P. O. N. contacts 525 break.

Relay 320 operates during each series of pulses over the following path: battery, relay 320, contacts 318, contacts 303 and ground. Contacts 324 make to operate slow-to-operate relay 340 at the completion of each series of pulses in multiple with relay 310. Contacts 323 make to operate relay 430. Contacts 322 break to open the circuit to busy relay 400. Contacts 321 break to open the circuit between the lower winding of relay 330 and the shift magnet 500. Relay 430 operates over the following path: battery, relay 430, conductor 359, contacts 323 and ground. Contacts 431 break to remove dial tone from the substation A and substitutes direct ground at contacts 403 for grounded dial tone. Contacts 433 complete the locking circuit for relay 430 through contacts 317.

The selector wipers 536', 537, 538, 539, 541 and 542 are advanced to the selected dialled level and relay 340, shortly after dialling, operates over the following path: battery, relay 340, contacts 324, contacts 302 and ground. Contacts 342 close to operate relay 440 in series with the shift magnet 500 of the selector. Contacts 343 complete a circuit from the lower winding of relay 440 to the "EC" wiper 541 of the selector. Contacts 345 complete a circuit from test relay 460 to the "C" wiper 542 of the selector.

Relay 440 operates in series with the shift magnet 500 over the following path: battery, upper winding of relay 440, conductor 337, contacts 332, contacts 342, conductor 336, contacts 462, contacts 404, contacts 418, conductor 324, S. O. N. contacts 519, P. O. N. contacts 524, shift magnet 500 and ground. Contacts 441 make to operate slow-to-release step relay 450. Contacts 442 prepare a holding circuit for relay 340. Relay 320 releases a short time after the completion of the first series of pulses.

Shift magnet 500 operates and contacts 543 and 502 make to prepare the drive magnet for stepping the selector wipers in the secondary movement across the bank contacts of the dialled level. Contacts 504 and 505 break to keep the circuit to the wipers open. Contacts 506 close to maintain shift magnet 500 in series with the upper winding of relay 440. Contacts 507 prepare a circuit to the cam springs and contacts 509 prepare a circuit to the all trunks busy meter ATB MTR. The selector is now prepared to hunt an idle connector.

Relay 450 operates over the following path: battery, relay 450, contacts 441, contacts 461, contacts 452, and ground on contacts 313. The selector is of the battery searching type. Relay 450 operates and the selector switch wipers 536', 537, 538, 539, 451 and 452 are stepped to the first bank contact of the selected bank level by operating the drive magnet 536 over the following path: battery, drive magnet 536, contacts 502, conductor 407, conductor 308, contacts 353, conductor 309, contacts 401, contacts 411, contacts 451, conductor 304, contacts 312, conductor 327, contacts 414, contacts 355, conductor 325, conductor 408, contacts 540 and ground. Secondary off-normal contacts of the selector operate in response to the first step in the secondary movement, contacts 517 opening the original energizing circuit to magnet 536 now operated over contacts 502, contacts 518 disconnects ground from conductor 408 which conductor, however, is grounded at contacts 540 of operated shift magnet 500, and at contacts 519 opens the original circuit of magnet 500 now maintained at contacts 506. Self-interrupting contacts 452 of relay 450 open after each operation of relay 450 and then close automatically to again complete an operating circuit for relay 450. This operation continues until the wipers 536, 537, 538, 539, 541, 542, encounter an idle connector. Contacts 451 complete the pulsing circuit to the drive magnet 536 during the hunting operation of the secondary movement.

Assuming now that all of the connector switches accessible from this selected level are busy, then the selector wipers continue to step as described until cam springs CS of the selector operate. Cam springs 527 completes a circuit from ground contacts 509 for operating the all-trunk-busy meter (not shown) over conductor ATB MTR. Cam contacts 526 complete a circuit for operating test relay 460 as follows: ground, winding of test relay 460, conductor 356, contacts 345 and 421, cam contacts 526, contacts 507 and through resistance R3 to battery. At contacts 461 relay 460 opens the circuit to the interrupter pulsing relay 450 to prevent its reoperation, at contacts 462 opens the series circuit of relay 440 and shift magnet 500 to cause their release. Relay 440 at contacts 441 opens a further point in the self-interrupting circuit of relay 450 and at contacts 442 opens the circuit to relay 340.

In the selector switch shift magnet 500 releases when its circuit is opened and at contacts 502 opens a further point in the circuit to drive magnet 536. At contacts 506 shift magnet 500 opens a further point in its own circuit and at contacts 509 opens the all trunk meter circuit. At contacts 507 shift magnet 500 opens the circuit to test relay 460 which releases and at contacts 508 prepares a circuit for operating busy relay 400. The release of relay 460 is without effect at this time because relay 440 at contacts 441 has opened the circuit to relay 450 and because the series circuit to relay 440 and shift magnet 500 is open at contacts 506 and 519.

When relay 340 releases, as a result of the release of relay 440, a circuit is completed for operating busy relay 400 as follows: from ground, contacts 508, cam contacts 526, conductor 424, contacts 421, 344, 322 and 406, winding of busy relay 400 to battery. Busy relay 400 operates and at contacts 405 completes a locking circuit for itself to grounded contact 316 before opening its energizing circuit at contacts 406. At contacts 401 relay 400 opens a further point in the stepping circuit to drive magnet 536 and at contacts 404 opens a further point in the circuit to shift magnet 500. At contacts 402 busy relay substitutes grounded busy tone source for direct ground at contacts 403, to transmit a busy tone to the calling subscriber. The circuit for transmitting busy tone to the calling subscriber may be traced from grounded busy tone source over the busy conductor B. T., contacts 402, 432, and through the lower winding of line relay 300 and over the calling loop to the calling subscriber.

When the calling subscriber hears the busy tone and replaces his receiver the switch train will be released in a manner to be described more fully hereinafter.

When an idle connector is found, "C" wiper 542 encounters a battery potential on the "C" bank contact of the idle connector and test relay 460 operates over the following path: ground, relay 460, conductor 356, contacts 345, conductor 349, contacts 421, conductor 424, contacts 515, wiper 542, contacts 534, resistance 547 and battery. Relay 460 operates and contacts 461 open the operating circuit to relay 450 to prevent further stepping in the secondary movement of the selector switch. Contacts 462 break to release shift magnet 500 and also relay 440. Relay 450 releases and contacts 451 break to open the pulsing circuit for drive magnet 536 to stop the secondary movement. Contacts 452 make to prepare an operating circuit for relay 450, and contacts 453 break to further open the operating circuit for relay 440 through the lower winding.

Relay 440 releases and contacts 441 break to further open the operating circuit of relay 450. Contacts 442 break to release relay 340.

Relay 340 releases and contacts 344 make to connect relay 400 to the "C" wiper and contact 344 opens the circuit to test relay 460 which releases. Contacts 343 break to further open the operating circuit to relay 440 through the lower winding. Contacts 342 break to further open the operating circuit to the upper winding of relay 440 and shift magnet 500.

Shift magnet 500 releases and contacts 501 and 503 make to extend a connection to the connector switch. Contacts 504 make to complete a circuit to operate the release magnet 530 of the connector switch. Contacts 505 make to prepare a circuit to operate the shift magnet 520 of the connector. Contacts 508 prepare a circuit to the cam springs. Relay 460 releases in response to the release of relay 340.

Release magnet 530 of the connector switch operates over the following path: battery, magnet 530, wiper 538, contacts 513, contacts 504, conductor 409, conductor 328, contacts 313 and ground.

The system is now prepared for the second series of digital impulses dialled from substation A and repeated by relay 300 through the contacts 301. The interruptions of the operating circuit to relay 300 will provide the repeating of the dialling impulses to the drive magnet 516 of the connector switch over the following path: battery, drive magnet 516, S. O. N. contacts 528, wiper 536, contacts 511, contacts 501, conductor 407, conductor 308, contacts 353, conductor 309, contacts 401, contacts 411, conductor 305, pulsing contacts 301, contacts 312, conductor 327, contacts 414, conductor 326, contacts 355, conductor 325, conductor 408, contacts 503, contacts 512, wiper 537, S. O. N. contacts 529 and ground. The switch steps in the primary movement and the connector wipers are now advanced opposite the dialled level.

Slow-to-release relay 320 operates again during the dialing of the second series of pulses over the following path: battery, relay 320, contacts 318, contacts 303 and ground. Relay 320 at contacts 321 maintains the circuit to relay 330 and shift magnet 520 open during the primary movement and at contacts 322 maintains the circuit to busy relay 400 open during the primary and secondary movements of the connector.

Slow-to-operate relay 340 operates upon the completion of the second series of pulses before relay 320 releases over the following path: battery, relay 340, contacts 324, contacts 302 and ground.

In response to the first step in the primary movement of the connector switch P. O. N. contacts 533 make to prepare an operating circuit to shift magnet 520, and P. O. N. contacts 534 open to remove battery from "C" wiper 546.

Relay 440 at this time does not operate in series with the shift magnet 520 of the connector, since battery is connected thereto.

Relay 340 operates before relay 320 releases and contacts 342 connect the shift magnet 520 in series with the upper winding of relay 440 without effect. Contacts 343 connect the lower winding of relay 440 in series with the "C" wiper 546. Contacts 345 connect relay 460 in series with the "C" wiper 546. A short time after the dialing of the second series of pulses, relay 320 releases.

Relay 320 releases and contacts 321 close to prepare a circuit placing the lower winding of relay 330 in series with the shift magnet 520 of the connector. Contacts 322 close to prepare the circuit to relay 400. Contacts 323 break, but it has no effect on relay 440 since the circuit is locked over a previously described path. Contacts 324 break to release relay 340.

Relay 340 releases and contacts 341 complete a circuit placing the lower winding of relay 330 in series with the shift magnet 520 of the connector.

Relay 330 operates in series with shift magnet 520 of the connector over the following path: ground, lower winding of relay 330, conductor 329, contacts 416, conductor 335, contacts 321, contacts 341, conductor 326, contacts 462, contacts 404, contacts 418, conductor 423, contacts 505, contacts 514, wiper 538, P. O. N. contacts 533, magnet 520 and battery.

Shift magnet 520 operates and contacts 521 opens the circuit to wiper 543 and contacts 522 prepare a circuit for operating magnet 516 to step the connector switch wiper across the banks of the dialled level in the secondary movement. Contacts 253 opens the circuit to wiper 544 and contacts 548 make to prepare an operating circuit for drive magnet 516 during the secondary movement.

Relay 330 operated over a previously described path and contacts 331 complete a circuit between the lower winding of relay 330 and the shift magnet 520 so that when the relay 320 operates during the third series of dialing pulses, relay 320 will not interrupt the circuit connecting the lower winding of relay 330 in series with the shift magnet 520. Contacts 332 break to open the circuit to the upper winding of relay 440. Contacts 333 make to prepare a circuit to relay 410.

The system is now prepared for the dialing of the third series of dialing impulses. Relay 300 repeats the digital impulses to operate the drive magnet 516 to step the connector wiper in the secondary movement across the bank contacts of the dialled level. Drive magnet 516 is operated over the following path: battery, drive magnet 516, contacts 522, wiper 536, contacts 511, contacts 501, conductor 407, contacts 353, conductor 309, contacts 401, contacts 411, conductor 305, contacts 301, contacts 312, conductor 327, contacts 414, conductor 326, contacts 355, conductor 325, conductor 408, contacts 503, contacts 512, wiper 537, S. O. N. contacts 529 and ground.

The connector wipers take the first step and S. O. N. contacts 528 and 529 break. After the first step, the drive magnet 516 is operated over the following path: battery, magnet 516, contacts 522, wiper 536′, contacts 511, contacts 501, conductor 407, contacts 353, conductor 309, contacts 401, contacts 411, conductor 305, contacts 301, contacts 312, conductor 327, contacts 414, conductor 326, contacts 355, conductor 325, conductor 408, contacts 503, contacts 512, wiper 537, contacts 548 and ground.

During the dialing of the third series of pulses relay 320 operates over the following path: battery, relay 320, contacts 318, contacts 303 and ground. Relay 320 operates and contacts 321 break, but they have no effect on the operation at this moment. Contacts 322 open the operating circuit to relay 400. Contacts 323 have no effect on the operation at this moment, since relay 400 is locked through contacts 433. Contacts 324 complete an operating circuit for slow-to-operate relay 340 which relay, however, due to its slow to operate characteristics, does not fully operate until shortly after the termination of the pulsing period.

Relay 340 operates at the completion of the dialing of the third series of impulses before relay 320 releases. Contacts 345 prepare the circuit to the testing relay 460. Contacts 343 prepare a circuit to the lower winding of relay 440.

The connector is now prepared to test for an idle subscriber's line.

If the line is busy, relay 460 will not operate because of the ground connection connected to the bank contact engaged by wiper 546. Relay 320 releases shortly after the completion of the third series of pulses. Contacts 324 break and relay 340 releases.

Relay 340 releases and contacts 344 complete a circuit to operate busy relay 400. Contacts 343 open a circuit between the lower winding of relay 440 and the "EC" wiper 545.

Relay 400 operates over the following path: battery, relay 400, contacts 406, conductor 357, contacts 322, contacts 344, conductor 349, contacts 421, conductor 424, contacts 515, wiper 542, contacts 533, and ground on the bank contact of the called line engaged by "C" wiper 546. Make-before-break contacts 405 lock relay 400 over the following path: battery, relay 400, contacts 405, conductor 358, contacts 316 and ground. Contacts 404 break to release the shift magnet 520 and relay 330 over a path previously described for operating the same. Contacts 402 make and contacts 403 break to send busy tone to the calling party over the following path: B. T. conductor, contacts 402, contacts 432, conductor 319, relay 300, +L conductor, line finder 354 and substation A. Contacts 401 open the pulsing circuit to drive magnet 516. After receipt of busy tone the calling subscriber may release the connection by replacing his receiver in a manner to be described hereinafter.

If the called line is idle, test relay 460 operates before relay 340 releases over the following path: ground, relay 460, conductor 356, contacts 345, contacts 421, conductor 424, contacts 515, wiper 542, contacts 533, "C" wiper 546 and through the winding of the B. C. O. relay of a called line to battery.

Relay 460 operates and contacts 461 open the operating circuit of relay 450. Contacts 462 open to release shift magnet 520 and relay 330. Contacts 463 open the circuit to the lower winding of relay 440. Contacts 464 make to operate relay 410 before contacts 333 open. Relay 330 and shift magnet 520 release in response to the operation of the test relay 460 and the shift magnet at contacts 521 and 523 prepares the ringing circuit.

Relay 410 operates over the following path: battery, relay 410, conductor 347, contacts 333, conductor 348, contacts 464 and ground. Contacts 419 lock relay 410 over the following path: battery, relay 410, contacts 419, conductor 346, contacts 315 and ground. Contacts 418 and 416 further open the circuit to shift magnet 520 and relay 330. Contacts 417 make to connect the lower winding of relay 330 to the positive conductor. Contacts 420 make to ground the "C" lead to hold the called line busy. Contacts 415 make to ground the positive talking conductor, and contacts 413 make to connect ring back tone condenser 549 to the calling line. Contacts 412 make to connect the interrupted generator to the called line over the following path: interrupter generator, conductor INT.GEN., relay 350, conductor 306, contacts 412, contacts 401, conductor 309, contacts 352, conductor 308, conductor 407, contacts 501, contacts 511, wiper 536, contacts 521, contacts 531 and wiper 543 over the called line and through the ringer at the called station back to wiper 544, contacts 532 and 523, wiper 537, contacts 512 and 503, conductor 408, contacts 355 and 415 to ground. Contacts 421 break to release relay 460 over a path previously described for operating the same. Relay 460 releases and contacts 464 break to open the original operating circuit of relay 410, contacts 463 make to prepare the circuit connecting the lower winding of relay 440 to the "EC" wiper 545. Relay 320 releases as previously described and contacts 324 break to release relay 340. Contacts 345 break to further open the operating circuit for relay 460. Ring back tone current will pass through condenser 549 to produce ring back tone to substation A over an obvious path.

When the called party answers, a direct current path is closed by the switchhook in the called substation to operate relay 350 over the previously traced ringing circuit. Relay 350 operates and contacts 352 and 354 close to complete the talking circuit from substation A to the called line. Contacts 351 lock relay 350 over the following path: battery, relay 350, contacts 351, contacts 311 and ground. Contacts 353 and 355 break to remove the ringing current and ring back tone from the talking conductors. Back bridge relay 330 now operates over the called line loop as follows: ground, lower winding of relay 330, contacts 417, 354, 503 and 512, wiper 537, contacts 523 and 532, wiper 544, the called station loop to wiper 543, contacts 531 and 521, wiper 536, contacts 511, 501, and 352, and through the upper winding of relay 330 to battery. Talking battery is fed through the windings of relay 330 to the called line and the talking battery for the calling line is fed through the windings of line relay 300.

After conversation and when the called subscriber replaces his receiver relay 330 releases. When the calling party replaces his receiver, relay 300 releases and contacts 302 break to release relay 310.

Relay 310 releases after an interval and contacts 311 break to open the locking circuit to relay 350, contacts 313 break to de-energize release magnet 510 to release the selector switch and to de-energize release magnet 530 to release the connector switch. Contacts 314 break to release the line finder 364 and the associated line equipment. Contacts 315 break to open the locking circuit of relay 410 to release relay 410. Contacts 317 break to open the locking circuit to relay 430 to release the same. Contacts 316 break to open the locking circuit of busy relay 400 in case relay 400 is operated. Relays 350, 410 and 430 release and the de-energization of release magnets 510 and 530 cause the release of the selector and connector switches. The system is now prepared for further operation.

The foregoing disclosure had assumed that an individual line was called. Referring now to Figure 8 and assuming that a P. B. X group had been called, "EC" wiper 545 and "C" wiper 546 of the connector would have encountered conditions as shown in Figure 8 in response to stopping on the first trunk line of a P. B. X group of lines. It should be remembered that relay 340 operates at the end of a third series of pulses over previously described path. Since "EC" wiper 345 is now in engagement with the first "EC" bank contact of a P. B. X group contacts 345 make to operate relay 440 over the following path: ground on "EC" bank contact of the first P. B. X trunk line, wiper 345, wiper 541, conductor 422, contacts 463, conductor 339, contacts 343, conductor 338, lower winding of relay 440 and battery. Relay 460 does not operate if the first P. B. X trunk line is busy since the "C" wiper 546 encounters a ground instead of battery.

Relay 440 operates and contacts 441 make to operate relay 450 over the following path: battery, relay 450, contacts 441, contacts 461, contacts 452 and ground. Contacts 442 close to maintain relay 340 operated over the following path: ground, contacts 442, conductor 361, relay 340 and battery.

Relay 450 operates and contacts 451 close to automatically step the connector across the trunks of the P. B. X group in search of an idle line over the following path: battery, magnet 516, contacts 522, wiper 536, contacts 511, contacts 501, conductor 407, conductor 308, contacts 353, conductor 309, contacts 401, contacts 411, contacts 451, conductor 304, contacts 312, conductor 327, contacts 414, conductor 326, contacts 355, conductor 325, conductor 408, contacts 503, contacts 512, wiper 537, contacts 548 and ground. Each time relay 450 operates it interrupts its own operating circuit at contacts 452 and operates contacts 451 of the pulsing circuit to operate the drive magnet 516.

In case the first trunk line in a P. B. X group is idle or if an intermediate trunk line is idle when the "C" wiper 546 engages its associated bank contact, relay 460 will operate in the following manner: ground 460, conductor 356, contacts 345, conductor 349, contacts 421, conductor 424, contacts 515, "C" wiper 542, contacts 533, "C" wiper 546, and battery through the winding of the B. C. O. relay of the idle trunk line.

Relay 460 operates and contacts 461 break to release relay 450 and prevent further hunting by opening the pulsing circuit. Contacts 462 open the circuits to relay 330 and shift magnet 520 which release as previously described and contacts 463 open the opening circuit to relay 440 which releases. Contacts 464 complete the circuit for operating relay 410.

Relay 410 operates over the following path: ground, contacts 464, conductor 348, contact 333, conductor 347, relay 410 and battery. Relay 410 operates and causes a switch through to the idle trunk line in a manner previously described in reference to a call to a direct line.

If an intermediate line is not idle, relay 440 is maintained operated by ground extending through the associated resistance to the "EC" contacts, as shown in Figure 8 connected to the intermediate lines. The "EC" contact individual to the last trunk line in the P. B. X group is not connected to ground with the result that when the connector wipers are stepped into engagement with the bank contacts of this last trunk line relay 440 releases since there is not any ground thereon to maintain it operated. Contacts 441 break to prevent further operation of relay 450 thereby stopping further hunting and contacts 442 releases relay 340. Relay 400 operates in case the last trunk line is busy in response to the release of relay 340 in a manner previously described to send busy tone back to the calling party. Upon the calling party replacing his handset, the switch train and relays release in a manner previously described.

In the two embodiments shown and described it will be noted that only one selector switch is shown. The common control unit circuits and the switch circuits are such that any desired number of intervening selector switches may be used between the common control unit and the final connector switch, so that this system could be used for larger networks. It should be noted that the shift magnets in the selector switches are connected through their windings to ground while the shift magnets in the final connector switches are connected through their windings to battery. In the common control units the stepping control relays, such as relays 130 in Fig. 2 and relay 440 in Fig. 5, are connected to battery and at times in series with the shift magnets and when these relays are operated the drive magnets of the switches are automatically stepped by self-interrupting relays, such as relays 120 and 450 in a manner apparent from the foregoing descriptions. Therefore, if the selectors shown have access to succeeding selectors instead of connectors the succeeding selectors would be operated in the same manner as described for the selectors shown. For example, if the selector in Fig. 3 has access to a succeeding selector instead of the connector shown, the selector in Fig. 3 seizes the idle succeeding selector in response to the "C" wiper 225 encountering a negative battery potential connected to the "C" bank contact of the succeeding selector. This battery potential extends from battery through a resistance, similar to resistance R, P. O. N. springs, similar to P. O. N. springs 216 and to the "C" bank contact of this succeeding selector. The test relay 160 in the common control unit is operated from this battery potential to stop the further stepping operations of the succeeding selector in the same manner as explained for the selector of Fig. 3.

After seizure the succeeding selector is then directively operated in its primary movement in response to the succeeding dialled digit and when relay 50 energizes shortly after this digit the circuit for operating relay 130 and the shift magnet of the succeeding selector is completed to ground through the winding of the shift magnet of the succeeding selector. This circuit may be traced from ground through the winding of the shift magnet of the succeeding selector over P. O. N. contacts, similar to P. O. N. contacts 215, S. O. N. contacts, similar to S. O. N. contacts 214, bank contact and wiper 235, contacts 212 and 203, and thence over conductor 107 and contacts 105, 145, 112, 161, 51, and 43, and winding of relay 130 to battery. In the same manner as described for the selector of Fig. 3 the succeeding selector is automatically stepped in its secondary movement in response to the operation of relay 130 and operations of relay 120 and switches through when an idle trunk is found. Further successive selectors may be seized and operated as just described and when the last switch in the switch train, for example, the connector of Fig. 3, has been operated in its primary movement the circuit is completed to shift magnet 220. As previously described, the shift magnet 220 is connected to battery and when relay 50 operates it connects shift magnet 220 to relay 130 which is also connected to battery and therefore neither the shift magnet 220 or relay 130 operate. However, when relay 50 releases the lower winding of relay 40 is energized in series with shift magnet 220 as previously described. The operation of relay 40 at this time places the common control unit so as to directively operate the connector in response to the last dialled digit, as previously described. The common control unit is therefore advised by the operation of relay 40 when battery, instead of ground, is encountered through the shift magnet that the last switch has been reached and that no automatic stepping is to take place unless a P. B. X group is called.

In the second embodiment shown in Figs. 4, 5 and 6 succeeding selectors may also be included in the switch train before the connector switch is reached. All of the shift magnets of the succeeding selectors would be connected to ground to control the operation of relay 440, which in turn controls the self-interrupting relay 450 to automatically step the succeeding selectors in an obvious manner apparent from the foregoing descriptions. Since shift magnet 520 of the connector is connected to battery, relay 440 will not operate when the common control unit is connected to the connector switch and relay 330 is operated in series with shift magnet 520 as previously described to enable the connector to be directively operated in its secondary movement in response to the last dialled digit.

While there has been described what is at present considered to be the preferred embodiment of the invention, it is to be understood that various modifications may be made thereof, and is contemplated in the appended claims to cover all such modifications within the true spirit and scope of the invention.

What is claimed is:

1. In a telephone system, a first switch having a primary and a secondary movement, a plurality of groups of second switches accessible to said first switch, each of said second switches having a primary and a secondary movement, a plurality of groups of lines accessible to each of said second switches, a control unit associated with said first switch, means for seizing and releasing said control unit, transmitting means in said control unit for transmitting impulses to said first switch, a first drive magnet in said first switch for operating said first switch in its primary movement to select a group of said second switches, means whereby said first drive magnet is operated responsive to impulses transmitted by said transmitting means, a first shift magnet in said first switch for changing over the operation of said first switch from its primary to its secondary movement, circuit means in said control unit for operating said first shift magnet, relay means for operating said circuit means, means whereby said relay means is operated responsive to the termination of said impulse transmission by said transmitting means and after said primary movement, testing means in said control unit, control means in said control unit for reoperating said first drive magnet to operate said first switch in its secondary movement in a testing operation, means whereby said testing means is successively connected to said second switches in said selected group in said testing operation, means whereby said control means is operated responsive to the operation of said circuit means, means in the first idle one of said second switches for operating said testing means, means whereby said means for operating said testing means is effective responsive to the connection of said testing means to said first idle second switch, means for disabling said control means to stop the testing operation and the secondary movement of said first switch to seize said idle second switch, means whereby said disabling means is operated responsive to the operation of said testing means, a first release magnet in said first switch, release control means in said control unit for operating said first release magnet, means whereby said release control means is operated responsive to the seizure of said control unit, switch connecting means for connecting said control unit to said seized idle second switch, means whereby said switch connecting means is completed responsive to the operation of said first release magnet and said seizure of said second switch, a second drive magnet in said idle seized second switch for operating said second switch in its primary movement to select a group of said lines, means whereby said second drive magnet is operated responsive to subsequent impulses transmitted by a reoperation of said transmitting means, a second shift magnet in said seized second switch for changing over the operation of said second switch from its primary to its secondary movement, other circuit means in said control unit for operating said second shift magnet, means whereby said other circuit means is operated responsive to another operation of said relay means, means whereby said relay means is again operated by said transmitting means after said subsequent impulse transmission and after said second switch primary movement, said second drive magnet again operated in response to a further reoperation of said transmitting means to operate said second switch in its secondary movement, means whereby a particular line of said selected group of lines is selected in response to said secondary movement, a second release magnet in said seized second switch, means including said release control means for operating said second release magnet, means whereby said means for operating said second release magnet is completed in response to the seizure of said second switch by said first switch, line connecting means for connecting said second switch to said selected line, means whereby said line connecting means is completed in response to the operation of said second release magnet and to said seizure of said line, means for restoring said first and second release magnets to release said first and second switches, and means whereby said restoring means is responsive to the release of said control unit.

2. In a telephone system, a first switch, a plurality of groups of second switches accessible to said first switch, a plurality of groups of lines accessible to each of said second switches, a control unit associated with said first switch, transmitting means in said control unit for transmitting impulses to said switches, switch directing means in said first switch for operating said first switch to select a group of said second switches, means whereby said switch directing means is operated responsive to impulses transmitted by said transmitting means, a test circuit in said control unit including first and second test relays, circuit controlling means in said control unit for reoperating said switch directing means to operate said switch in a testing operation, means whereby said test circuit is successively connected to said second switches in said selected group in response to said testing operation, means for operating said circuit controlling means, means whereby said means for operating said circuit controlling means is operated responsive to the termination of said impulse transmission by said transmitting means, means in the first idle one of said second switches for operating the first of said test relays, means whereby said means for operating said first test relay is effective responsive to the connection of said test circuit to said first idle one of said second switches in said selected group, means for disabling said circuit controlling means to stop the testing operation of said first switch and to seize said idle second switch, means whereby said disabling means is operated responsive to the operation of said first test relay, drive means in said seized second switch for operating said seized switch to select a group of said lines accessible thereto, means whereby said drive means is operated responsive to subsequent impulses transmitted by said transmitting means, means for reoperating said circuit controlling means, means whereby said means for reoperating said circuit controlling means is operated responsive to the termination of said subsequent impulse transmission by said transmitting means and said selection of said group of lines, said drive means reoperated in response to a reoperation of said circuit controlling means to operate said second switch in a testing operation, means whereby said test circuit is connected to successive lines of said selected group in response to said last mentioned testing operation, means in the first idle line of said selected group for again operating said first test relay, means whereby said means for again operating said first test relay is effective responsive to the connection of said test circuit to said first idle line, said disabling means again operated by said reoperation of said first test relay for disabling said circuit controlling means to stop the testing operation of said second switch and to seize said idle line, said second test relay also operated over said idle line and said test circuit, and means for connecting said control unit through said first and second switches to said selected idle line, said last mentioned connecting means operated responsive to the operation of said second test relay.

3. In a telephone system, a first switch having a primary and a secondary movement, a plurality of groups of second switches accessible to said first switch, each of said second switches having a primary and a secondary movement, a plurality of groups of lines accessible to each of said second switches, a control unit associated with said first switch, transmitting means in said control unit for transmitting impulses to said first switch, a first drive magnet in said first switch for operating said first switch in its primary movement to select a group of said second switches, means whereby said first drive magnet is operated in response to impulses transmitted by said transmitting means, a first shift magnet in said switch for changing over the operation of said first switch from its primary movement to its secondary movement, circuit means in said control unit for operating said first shift magnet to condition said first switch for its secondary movement, means whereby said circuit means is effective responsive to the termination of said impulse transmission by said transmitting means, a test circuit in said control unit including first and second test relays connected in series, pulsing means in said control unit for reoperating said first drive magnet to operate said first switch in its secondary movement in a testing operation, means whereby said test circuit is successively connected to said second switches in said selected group in response to said secondary movement, means whereby said pulsing means is operated responsive to the operation of said circuit means, means in the first idle one of said second switches for operating said first test relay, means whereby said means for operating said first test relay is effective responsive to the connection of said test circuit to said first idle second switch in said selected group, means for disabling said impulsing means to stop the testing operation and said secondary movement to seize said idle second switch, means whereby said disabling means is operated responsive to the operation of said first test relay, a second drive magnet in said seized second switch for operating said second switch in its primary movement to select a group of said lines, means whereby said second drive magnet is operated responsive to a subsequent reoperation of said transmitting means, a second shift magnet in said second switch for changing over the operation of said second switch from its primary to its secondary movement, means in said control unit for operating said second shift magnet, means whereby said means for operating said second shift magnet is operated responsive to said subsequent reoperation of said transmitting means and said primary movement of said second switch, said second drive magnet again operated in response to a further reoperation of said transmitting means for operating said second switch in an initial secondary movement to select a particular line of said selected group of lines, other means in said control unit for re-enabling said pulsing means, means whereby said other means is operated responsive to said selection of said particular line, said second drive magnet reoperated in response to the operation of said re-enabled pulsing means for operating said second switch in a further secondary movement in a line testing operation, means whereby said test circuit is successively connected to said lines in said selected group in response to said line testing operation, means associated with the first idle one of said lines in said selected group for operating both said first and second test relays, means whereby said means for operating both said test relays is effective responsive to the connection of said test circuit to said first idle one of said lines in said selected group, said disabling means again operated by said first test relay for disabling said pulsing means to stop the line testing operation and said further secondary movement to seize said idle line, means for completing a switch through operation from said control unit to said seized idle line, and means whereby said last mentioned means is operated responsive to the operation of said second test relay.

4. In a telephone system, a switch having a primary and a secondary movement, a plurality of groups of second switches accessible to said first switch, a control unit associated with said switches, transmitting means in said control unit for transmitting a series of pulses to said first switch, a drive magnet in said first switch for stepping said first switch in the primary movement to select a particular group of second switches, means whereby said drive magnet is operated responsive to the transmission of a series of pulses by said transmitting means, a first relay in said control unit, means associated with said control unit for operating said first relay, means whereby said means for operating said first relay is responsive to the completion of a transmitted series of pulses by said transmitting means, a second relay in said control unit, a shift magnet in said first switch for causing said first switch to change from a primary movement to a secondary movement, means for operating said shift magnet and said second relay in series, means whereby said shift magnet operating means is effective responsive to the operation of said first relay, a test circuit in said control unit, a pulsing circuit in said control unit for operating said drive magnet to cause said first switch to step in the secondary movement, means whereby said test circuit is successively connected to said second switches in the selected group in response to said secondary movement, means for completing said pulsing circuit, and means whereby said completing means is operated responsive to the operation of said second relay.

5. In a telephone system, a first switch having a primary and a secondary movement, a plurality of groups of second switches accessible to said first switch, a control unit associated with said switches, transmitting means in said control unit for transmitting a series of pulses to said first switch, a drive magnet in said first switch for stepping said first switch in the primary movement to select a particular group of second switches, means whereby said drive magnet is operated responsive to the transmission of the series of pulses transmitted by said transmitting means, a first relay in said control unit, means associated with said control unit for operating said first relay, means whereby said first relay operating means is operated responsive to the completion of the transmitted series of pulses by said transmitting means, a second relay in said control unit, a shift magnet in said first switch for causing said first switch to change from a primary movement to a secondary movement, means associated with said control unit for operating said shift magnet and said second relay in series, means whereby said shift magnet operating means is effective responsive to the operation of said first relay, a test circuit in said control unit, a pulsing circuit in said control unit for operating said drive magnet to cause said first switch to step in the secondary movement, means whereby said test circuit is successively connected to said second switches in the selected group in response to said secondary movement, means for completing said pulsing circuit, means whereby said completing means is operated responsive to the operation of said second relay, a circuit in said control unit for maintaining said first relay operated, and means whereby said circuit is completed responsive to the operation of said second relay.

6. In a telephone system, a first switch having a primary and a secondary movement, a plurality of groups of second switches accessible to said first switch, a control unit associated with said switches, transmitting means in said control unit for transmitting a series of pulses to said first switch, a drive magnet in said first switch for stepping said first switch in the primary movement to select a particular group of second switches, means whereby said drive magnet is operated responsive to the transmission of the series of pulses transmitted by said transmitting means, a first relay in said control unit, means for operating said first relay, means whereby said first relay operating means is operated responsive to the completion of the transmittted series of pulses by said transmitting means, a second relay in said control unit, a shift magnet in said first switch for causing said first switch to change from a primary movement to a secondary movement, means associated with said control unit for operating said shift magnet and said second relay in series, means whereby said shift magnet operating means is effective in response to the operation of said first relay, a testing relay in said control unit, a pulsing circuit in said control unit for operating said drive magnet to cause said first switch to step in the secondary movement, means whereby said testing relay is successively connected to said second switches in the selected group in response to said secondary movement, means for completing said pulsing circuit, means whereby said completing means is operated in response to the operation of said second relay, a circuit in said control unit for maintaining said first relay operated, maintaining means whereby said maintaining circuit is completed in response to the operation of said second relay, means in the first idle one of said second switches in said selected group for operating said testing relay, means whereby said means for operating said testing relay is effective in response to the connection of said testing relay to said first idle second switch, means for stopping the stepping of said first switch in its secondary movement by opening said pulsing circuit and for releasing said second relay, means whereby said stopping means is operated in response to the operation of said testing relay, and said maintaining circuit opened by said maintaining means in response to the release of said second relay to release said first relay.

7. A telephone system as claimed in claim 6 including a circuit for operating said testing relay, and means whereby said circuit for operating said testing relay is prepared in response to the operation of said first relay.

8. In a telephone system, a first two-movement switch, a plurality of groups of second two-movement switches accessible to said first switch, a plurality of groups of lines accessible to each of said second switches, a control unit associated with said switches, transmitting means associated with said control unit for transmitting three series of pulses, a first drive magnet in said first switch for stepping said first switch selectively in the primary movement to select a particular group of second switches, means whereby said first drive magnet is operated responsive to the first series of pulses transmitted by said transmitting means, a first shift magnet in said first switch for changing over the operation of said first switch from a primary to a secondary movement, a first relay in said control unit, means in said control unit for operating said first relay, means whereby said first relay operating means is operated responsive to the completion of the first series of pulses transmitted by said transmitting means, a second relay in said control unit, means in said control unit for operating said first shift magnet and said second relay in series, means whereby said shift magnet operating means is effective in response to the operation of said first relay, a pulsing circuit in said control unit for reoperating said first drive magnet to cause said first switch to step in the secondary movement, means whereby said first switch is connected to successive second switches in said selected group in response to said secondary movement, means for completing said pulsing circuit, means whereby said pulsing circuit completing means is operated in response to the operation of said second relay, means for stopping the secondary movement of said first switch, means whereby said stopping means is operated in response to said first switch connecting with the first idle one of said second switches in said selected group to select said idle second switch, a second drive magnet in said selected second switch for stepping said second switch selectively in the primary movement to select a particular group of lines accessible to said selected second switch, means whereby said second drive magnet is operated in response to said second series of pulses transmitted by said transmitting means, a second shift magnet in said second switch for changing over the operation of said second switch from a primary movement to a secondary movement, said first relay operating means reoperating and restoring said first relay in response to the completion of the second series of pulses transmitted by said transmitting means, a third relay in said control unit, means for operating said third relay in series with said second shift magnet, means whereby said means for operating said third relay and second second shift magnet is operated in response to the restoration of said first relay, and said second drive magnet again operated by said transmitting means in response to the third series of pulses to step said second switch in the secondary movement to select a particular line of said selected group of lines.

9. In a telephone system, a first two-movement switch, a plurality of second two-movement switches accessible to said first switch, a plurality of groups of bank contacts accessible to each of said second switches, a control unit associated with said switches, transmitting means in said control unit for transmitting three series of pulses, a first drive magnet in said first switch for stepping said first switch in the primary movement to select a particular group of second switches, means whereby said first drive magnet is operated by said transmitting means in response to the first series of pulses, a first shift magnet in said first switch for changing over the operation of said first switch from a primary to a secondary movement, a first relay in said control unit, means in said control unit for operating said first relay, means whereby said first relay operating means is operated responsive to the completion of the first series of pulses transmitted by said transmitting means, a second relay in said control unit, means in said control unit for operating said second relay in series with said shift magnet, means whereby said second relay and said shift magnet operating means is operated in response to the operation of said first relay, a pulsing circuit in said control unit for operating said first drive magnet to operate said first switch in the secondary movement, means whereby said first switch is connected to successive second switches in the selected group in response to said secondary movement, means for completing said pulsing circuit, means whereby said pulsing circuit completing means is operated in response to the operation of said second relay, means for stopping the secondary movement of said first switch, means whereby said stopping means is operated responsive to said first switch connecting with the first idle one of said second switches in said selected group to select said idle second switch, a second drive magnet in said selected second switch for operating said second switch selectively in the primary movement to select a particular group of bank contacts accessible to said selected second switch, means whereby said second drive magnet is operated by said transmitting means in response to the second series of pulses, a second shift magnet in said second switch for changing over the operation of said second switch from a primary to a secondary movement, said first relay reoperated and restored by said first relay operating means in response to the completion of the second series of pulses by said transmitting means, a third relay in said control unit, means in said control unit for operating said third relay in series with said second shift magnet, means whereby said third relay and said second shift magnet operating means is operated in response to the restoration of said first relay, said second drive magnet again operated by said transmitting means to step said second switch in the secondary movement in response to the third series of pulses for selecting a bank contact of said selected group of bank contacts, an alternating current relay in said control unit, means for extending a connection from said selected bank contact to said alternating current relay, a source of alternating current potential on said selected bank contact effective for operating said alternating current relay over said extended connection, means whereby said pulsing circuit is completed in response to the operation of said alternating current relay, and said second drive magnet operating in response to the completion of said pulsing circuit to step said second switch to the next bank contact.

10. In a telephone system, a first two-movement switch, a plurality of groups of second two-movement switches accessible to said first switch, a plurality of groups of bank contacts accessible to each of said second switches, a control unit associated with said switches, transmitting means in said control unit for transmitting three series of pulses, a first drive magnet in said first switch for stepping said first switch in the primary movement to select a particular group of second switches, means whereby said first drive magnet is operated by said transmitting means in response to the first series of pulses, a first shift magnet in said first switch for causing said first switch to change from a primary to a secondary movement, a first relay in said control unit, means for operating said first relay, means whereby said first relay operating means is operated by said transmitting means responsive to the completion of the first series of pulses, a second relay in said control unit, means in said control unit for operating said first shift magnet in series with said second relay, means whereby said first shift magnet and said second relay operating means is operated in response to the operation of said first relay, a pulsing circuit in said control unit for operating said first drive magnet to cause said first switch to step in the secondary movement, means whereby said first switch is connected to successive second switches in the selected group in response to said secondary movement, means for completing said pulsing circuit, means whereby said pulsing circuit completing means is operated in response to the operation of said second relay, means for stopping the secondary movement of said first switch, means whereby said stopping means is operated in response to said first switch connecting with the first idle one of said second switches in said selected group to select said idle second switch, a second drive magnet in said selected second switch for stepping said second switch in the primary movement to select a particular group of bank contacts accessible to said selected second switch, means whereby said second drive magnet is operated by said transmitting means in response to the second series of pulses, a second shift magnet in said second switch for causing said second switch to change from a primary movement to a secondary movement, said first relay reoperated and restored by said first relay operating means in response to the completion of the second series of pulses by said transmitting means, a third relay in said control unit, means in said control unit for operating said third relay in series with said second shift magnet, means whereby said third relay and said second shift magnet operating means is operated in response to the restoration of said first relay, said second drive magnet reoperated by said transmitting means to directively step said second switch in the secondary movement in response to the third series of pulses to select a contact of said selected group, means for extending a connection from the selected bank contact to said second relay, a source of potential on said selected bank contact of said selected group of bank contacts, means whereby said source of potential is effective over said connecting means to reoperate said second relay, said pulsing circuit again completed in response to the reoperation of said second relay, and said second drive magnet operating in response to the reoperation of said pulsing circuit to step said second switch to the next bank contact.

11. In a telephone system, an automatic switch, a first and second group of bank contacts accessible to said switch, said second group of bank contacts having idle and busy bank contacts, an alternating current relay, a test relay, means including said switch for connecting said alternating current relay to one contact of said first group of bank contacts, means including said switch for connecting said test relay to one contact of said second group of bank contacts, a source of alternating current potential connected to said one contact of said first group of bank contacts, means whereby said alternating current source is effective to operate said alternating current relay in response to the connection of said alternating current relay to said one contact of said first group, a stepping circuit associated with said switch for stepping said switch, means whereby said switch is connected with the succeeding bank contacts of said first and second groups of bank contacts in response to said stepping operation, means whereby said stepping circuit is completed in response to the operation of said alternating current relay, means for operating said test relay, means whereby said test relay operating means is effective in response to said switch connecting with an idle bank contact of said second group of bank contacts, means for opening said stepping circuit to stop said switch, and means whereby said last means is operated by said test relay in response to the operation of said test relay.

12. In a telephone system, an automatic switch, a first and second group of bank contacts accessible to said switch, said second group of bank contacts consisting of idle and busy bank contacts, a source of alternating current potential connected to one bank contact of said first group, an alternating current relay, means including said switch for connecting said alternating current relay to said one contact of said first group of bank contacts, means whereby said alternating current source is effective to operate said alternating current relay in response to said last means connecting said alternating current relay to said one contact of said first group of bank contacts, a locking circuit associated with said alternating current relay, means whereby said locking circuit is completed in response to the operation of said alternating current relay for maintaining said alternating current relay operated, a stepping circuit associated with said switch for stepping said switch, means whereby said switch is connected with the succeeding bank contacts of said first and second group of bank contacts in response to said stepping operation, means whereby said stepping circuit is completed in response to the operation of said alternating relay, a test relay, means including said switch for connecting said test relay to successive bank contacts of said second group of bank contacts during the stepping operation of said switch, a source of idle potential connected to the idle bank contacts of said second group, means whereby said source of idle potential is effective to operate said test relay in response to the connection of said test relay to the first idle bank contact of said second group, means for opening said stepping circuit and for releasing said alternating current relay, and means whereby said last means is operated in response to the operation of said test relay.

13. In a telephone system, an automatic switch, a first and second group of bank contacts associated with said switch, a source of alternating current potential connected to the first contact of said first group of bank contacts, a source of battery potential connected to the last contact of said first group of bank contacts, said second group of bank contacts consisting of idle and busy bank contacts, means for directively stepping said switch to the first contact of said first and second groups of bank contacts, a first wiper in said switch being connected to said first contact of said first group of bank contacts in response to the operation of said directive stepping means, an alternating current relay, means including said alternating current potential for operating said alternating current relay in response to said first wiper connecting with said first bank contact of said first group, a second wiper in said switch being connected to the first contact of said second group of bank contacts in response to the operation of said directive stepping means, a stepping circuit associated with said switch for stepping said wipers in an automatic hunting operation to connect said wipers to successive ones of their respective bank contacts, means whereby said stepping circuit is completed in case said second wiper encounters a busy bank contact, a locking circuit associated with said alternating current relay, means whereby said locking circuit is completed in response to the operation of said alternating current relay for maintaining said alternating current relay operated, a test relay, means for operating said test relay, means whereby said test relay operating means is completed in response to said second wiper encountering an idle bank contact, means for opening said stepping circuit and for releasing said alternating current relay, means whereby said stepping circuit opening means and said releasing means is operated in response to the operation of said test relay, means for connecting said test relay to said first wiper, means for operating said test relay over said last mentioned connecting means in case said first wiper encounters the last contact of said first group of bank contacts, and said means for opening said stepping circuit and for releasing said alternating current relay operated in response to the operation of said test relay.

14. In a telephone system, a switch having a primary and a secondary movement, a control unit associated with said switch, means for seizing and releasing said control unit, a drive magnet in said switch for operating said switch in its primary and secondary movements, transmitting means in said control unit for transmitting series of impulses to said drive magnet, means whereby said drive magnet is operated by said transmitting means in response to a first series of impulses to step said switch in the primary movement, a shift magnet in said switch for changing over the operation of said switch from its primary to its secondary movement, means in said control unit for operating said shift magnet, means whereby said shift magnet operating means is effective after termination of said first series of impulses transmitted by said transmitting means, said drive magnet again operated by said transmitting means in response to another series of impulses to step said switch in the secondary movement, a release magnet in said switch, means in said control unit for energizing said release magnet, means whereby said energizing means is operated by said seizing and releasing means in response to seizing of said control unit, means for maintaining said switch operated after the primary and secondary movements, means whereby said maintaining means is operated in response to the operation of said release magnet, said energizing means in said control unit restored by said seizing and releasing means responsive to the release of said control unit for deenergizing said release magnet, and said maintaining means restored by said release magnet when deenergized for releasing said switch.

15. In a switching system, a switch having a primary and a secondary movement, a control unit associated with said switch, means for seizing and releasing said control unit, a drive magnet in said switch for operating said switch in its primary and secondary movements, impulsing means in said control unit for operating said drive magnet, means for operating said impulsing means, means whereby said drive magnet is operated in response to the operation of said impulsing means to cause said switch to step in the primary movement, a shift magnet in said switch for changing over the operation of said switch from its primary to its secondary movement, means in said control unit for operating said shift magnet, means whereby said shift magnet operating means in effective upon the completion of the primary movement of said switch, control means in said control unit for reoperating said drive magnet to operate said switch in the secondary movement, means for operating said control means, means whereby said means for operating said control means is operated by said shift magnet operating means, testing means in said control unit for controlling the operation of said switch in the secondary movement, means for operating said testing means during the secondary movement, means for disabling said control means to stop the secondary movement, means whereby said disabling means is operated in response to the operation of said testing means, a release magnet in said switch for controlling the release of said switch, means in said control unit for energizing said release magnet, means whereby said energizing means is operated in response to seizure of said control unit, means whereby said switch is maintained operated after the primary and secondary movements by the energization of said release magnet, said release magnet energizing means in said control unit restored responsive to the release of said control unit by said seizing and releasing means for deenergizing said release magnet, and said maintaining means disabled by said release magnet when deenergized for releasing said switch.

16. In a switching system, a plurality of lines, a switch having a primary and a secondary movement to select a particular one of said lines, a control unit associated with said switch, means for seizing and releasing said control unit, a drive magnet in said switch for stepping said switch in its primary and secondary movements, impulsing means in said control unit for operating said drive magnet, means for operating said impulsing means, means whereby said drive magnet is operated in response to the operation of said impulsing means to cause said switch to step in the primary movement, a shift magnet in said switch for changing over the operation of said switch from its primary to its secondary movement, means in said control unit for operating said shift magnet, means whereby said shift magnet operating means is effective upon the completion of said primary movement, said drive magnet again operated by said impulsing means in response to a reoperation of said means for operating said impulsing means to step said switch in the secondary movement to select a particular one of said lines, a release magnet in said switch for controlling the release of said switch, means in said control unit for energizing said release magnet, means whereby said energizing means is operated in response to the seizure of said control unit, means for maintaining said switch operated, means whereby said maintaining means is operated in response to the operation of said release magnet, means for extending a connection from said switch to said selected line, means whereby said connecting means is operated in response to the energization of said release magnet and completed in response to the completion of said secondary movement, said release magnet energizing means in said control unit restored responsive to the release of said control unit by said seizing and releasing means for deenergizing said release magnet, and said maintaining means restored by said release magnet when deenergized to release said switch from said line.

17. In a telephone system, a plurality of lines, a switch having a primary and a secondary movement to select a particular one of said lines, a control unit associated with said switch, means for seizing and releasing said control unit, a drive magnet in said switch for stepping said switch in its primary and secondary movements, impulsing means in said control unit for operating said drive magnet, means for operating said impulsing means, means whereby said drive magnet is operated in response to the operation of said impulsing means to step said switch in the primary movement to select said plurality of lines, a shift magnet in said switch for changing over the operation of said switch from its primary to its secondary movement, means in said control unit for operating said shift magnet, means whereby said shift magnet operating means is effective upon completion of the primary movement of said switch, control means in said control unit for reoperating said drive magnet to operate said switch in the secondary movement to successively connect with said lines in a testing operation, means for operating said control means, means whereby said means for operating said control means is operated by said shift magnet operating means, testing means in said control unit, means whereby said testing means is successively connected to said lines to test said lines during the secondary movement of said switch, means for operating said testing means in response to the connection of said testing means to the first idle one of said lines, means for stopping the operation of said switch to connect with said idle line, means whereby said stopping means is operated in response to the operation of said testing means, a release magnet in said switch for controlling the release of said switch, means in said control unit for energizing said release magnet, means for maintaining said switch operated, means whereby said maintaining means is operated in response to the operation of said release magnet, means whereby said energizing means is operated in response to the seizure of said control unit, means for extending a connetcion from said switch to said idle line, means whereby said connecting means is operated in response to the energization of said release magnet and completed in response to the completion of said secondary movement, said release magnet operating means restored responsive to the release of said control unit by said seizing and releasing means for deenergizing said release magnet, and said maintaining means restored when said release magnet is deenergized to release said switch from said idle line.

18. In a switching system, wherein a connection is extended progressively over a train of two motion switches, a control unit associated with the first switch of said train, means for seizing and releasing said control unit, impulsing means in said control unit, a drive magnet in each of said switches for driving said switches in said two motions, a shift magnet in each of said switches for changing over the operation of said respective switches from their first motion to their second motion, a release magnet in each of said switches for controlling the release of said switches, release means in said control unit for energizing said release magnets, means whereby said release means is operated in response to the operation of said seizing and releasing means to operate the first release magnet of said first switch, means for maintaining said first switch in operated position, means whereby said maintaining means is operated in response to the operation of said first release magnet, means for operating said impulsing means, means whereby said first drive magnet of said first switch is operated in response to the operation of said impulsing means to drive said first switch in its first motion, means for operating the first shift magnet of said first switch, means whereby said first shift magnet operating means is operated upon completion of the first motion of said first switch, means for reoperating said first drive magnet to drive said first switch in its second motion to extend a connection to the second switch in said train, means whereby said first drive magnet reoperating means is operated after operation of said first shift magnet, means for extending a connection from said control unit through said first switch to said second switch, means whereby said connecting means is completed by said operated first release magnet and in response to the completion of the second motion of said first switch, means including said release means for operating the second release magnet in said second switch, means whereby said last mentioned means is completed in response to the completion of said connecting means, means for maintaining said second switch in operated position, said last mentioned maintaining means operated in response to the operation of said second release magnet, circuit controlling means for operating the second drive magnet of said second switch to drive said second switch in its first motion, means whereby said circuit controlling means is effective in response to a reoperation of said impulsing means, means for operating the second shift magnet of said second switch, means whereby said second shift magnet operating means is operated upon completion of the first motion of said second switch, said second drive magnet reoperated over said circuit controlling means in response to a further operation of said pulsing means to drive said second switch in its second motion to extend the connection beyond said second switch, said release means being restored in response to the release of said control unit by said seizing and releasing means, both said first and second release magnets being deenergized in response to the restoration of said release means, said first and second switch maintaining means being restored in response to the deenergization of said first and second release magnets, and said first and second switches being released in response to the restoration of said maintaining means.

19. In a telephone system having a selector switch, a connector switch accessible to said selector switch and a line accessible to said connector switch, said switches each having a primary and a secondary movement, a control unit, a group of four conductors interconnecting said selector and control unit, a second group of four conductors outgoing from said selector and connected to said connector, transmitting means within said control unit for transmitting pulses over the first conductor of said first group to said selector, selector means in said selector for operating said selector in the primary and secondary movements to connect with said connector, means whereby said selector means is operated over the first conductor of said first group in response to the operation of said transmitting means, changeover means within said selector for changing over the operation of said selector from its primary to its secondary movement, means for operating said selector changeover means over the second conductor of said first group, means whereby said selector changeover operating means is operated after the primary movement of said selector, means for connecting the four conductors of said first group to said four conductors of said second group, means whereby said connecting means is effective in response to the completion of the secondary movement of said selector, connector means in said connector for operating said connector in its primary and secondary movements to connect with said line, means whereby said connector means is operated over the first conductor of both of said groups by successive reoperations of said transmitting means, changeover means within said connector for changing over the operation of said connector from its primary movement to its secondary movement, means for operating said connector changeover means over the second conductor of both of said groups, means whereby said connector changeover operating means is operated after the primary movement of said connector switch, means for connecting said connector to said line, means whereby said line connecting means is effective in response to the completion of the secondary movement of said connector, release means within said selector and connector for maintaining and releasing said selector and connector, means in said control unit for controlling said release means over the third conductor of both of said groups, testing means in said control unit for testing said line, and means whereby said testing means is operated over the fourth conductor of both of said groups in response to said line connecting means becoming effective.

20. In a telephone system having a selector switch, a connector switch accessible to said selector switch and a line accessible to said connector switch, said switches each having a primary and a secondary movement, a control unit, a group of conductors interconnecting said selector and said control unit, a second group of conductors outgoing from said selector and connected to said connector, transmitting means within said control unit for transmitting pulses over the first and second conductors of said first group to said selector, selector means in said selector for operating said selector in the primary and secondary movements to connect with said connector, means whereby said selector means is operated over the first and second conductors of said first group in response to the operation of said transmitting means, changeover means in said selector for changing over the operation of said selector from its primary movement to its secondary movement, means for operating said selector changeover means over the third conductor of said first group, means whereby said selector changeover operating means is operated after the primary movement of said selector, means for connecting said first group of conductors to said second group of conductors, means whereby said connecting means is effective in response to the completion of the secondary movement of said selector, connector means in said connector for operating said connector in its primary and secondary movements to connect with said line, means whereby said connector means is operated over the first and second conductors of both of said groups in response to successive reoperations of said transmitting means, changeover means in said connector for changing over the operation of said connector from its primary movement to its secondary movement, means for operating said connector changeover means over the third conductor of both said groups, means whereby said connector changeover operating means is operated after the primary movement of said connector switch, means for connecting said connector to said line, means whereby said line connecting means is effective in response to completion of the secondary movement of said connector, release means within said selector and connector for maintaining and releasing said selector and connector, means in said control unit for controlling said release means over the fourth conductors of both of said groups, testing means in said control unit for testing said line, and means whereby said testing means is operated over the fifth conductor of both of asid groups in response to said line connecting means becoming effective.

21. In a telephone system as claimed in claim 20, including a group of trunk lines accessible to said connector switch, trunk group testing means within said control unit for testing for an idle trunk line in said group of trunk lines, and means whereby said trunk group testing means is controlled over the sixth conductor in both said groups in response to the connection of said connector to the first trunk of said trunk group.

22. A telephone system as claimed in claim 19 in which the first and second conductors of both groups are talking conductors.

JOHN H. VOSS.

References Cited in the file of this patent

UNITED STATES PATENTS

| Number | Name | Date |
|---|---|---|
| 1,110,492 | Kaisling | Sept. 15, 1914 |
| 1,609,616 | Friendly | Dec. 7, 1926 |
| 1,614,293 | Friendly | Jan. 11, 1927 |
| 1,891,423 | Kahn | Dec. 20, 1932 |
| 2,218,848 | Lomax | Oct. 22, 1940 |
| 2,506,730 | Morris | May 9, 1950 |